United States Patent
Xia et al.

(10) Patent No.: US 11,752,731 B2
(45) Date of Patent: Sep. 12, 2023

(54) ARTICLES HAVING ADHESIVE LAYERS INCLUDING URETHANE ACRYLATE POLYMER OR ACRYLATE COPOLYMER

(71) Applicant: 3M INNOVATIVE PROPERTIES COMPANY, St. Paul, MN (US)

(72) Inventors: Ying Xia, Woodbury, MN (US); Tien Yi T. H. Whiting, St. Paul, MN (US); Shri Niwas, Maple Grove, MN (US); Duane D. Fansler, Dresser, WI (US); Carla S. Thomas, Woodbury, MN (US); Anthony F. Schultz, Forest Lake, MN (US); Alexander J. Kugel, Woodbury, MN (US); Corinne E. Lipscomb, St. Paul, MN (US); Mary M. Caruso Dailey, Maplewood, MN (US); Jonathan E. Janoski, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 927 days.

(21) Appl. No.: 16/621,563

(22) PCT Filed: Jun. 27, 2018

(86) PCT No.: PCT/IB2018/054778
§ 371 (c)(1),
(2) Date: Dec. 11, 2019

(87) PCT Pub. No.: WO2019/003158
PCT Pub. Date: Jan. 3, 2019

(65) Prior Publication Data
US 2023/0105298 A1  Apr. 6, 2023

Related U.S. Application Data
(60) Provisional application No. 62/527,090, filed on Jun. 30, 2017.

(51) Int. Cl.
*B32B 7/12* (2006.01)
*C08F 220/18* (2006.01)
*C09J 151/00* (2006.01)
*C08F 220/34* (2006.01)

(52) U.S. Cl.
CPC .......... *B32B 7/12* (2013.01); *C08F 220/1808* (2020.02); *C09J 151/003* (2013.01); *C08F 220/343* (2020.02)

(58) Field of Classification Search
CPC .................................................... G02B 5/136
See application file for complete search history.

(56) References Cited

U.S. PATENT DOCUMENTS

| | | | |
|---|---|---|---|
| 1,175,224 A | 3/1916 | Bleecker |
| 2,461,011 A | 2/1949 | Taylor |
| 2,726,161 A | 12/1955 | Beck |
| 2,842,446 A | 7/1958 | Beck |
| 2,853,393 A | 9/1958 | Beck |
| 2,870,030 A | 1/1959 | Stradley |
| 2,939,797 A | 6/1960 | Rindone |
| 2,965,921 A | 12/1960 | Bland |
| 2,992,122 A | 7/1961 | Beck |
| 3,468,681 A | 9/1969 | Jaupain |
| 3,700,305 A | 10/1972 | Bingham |
| 3,946,130 A | 3/1976 | Tung |
| 4,181,752 A | 1/1980 | Martens |
| 4,192,576 A | 3/1980 | Tung |
| 4,243,500 A | 1/1981 | Glennon |
| 4,367,919 A | 1/1983 | Tung |
| 4,564,556 A | 1/1986 | Lange |
| 4,758,469 A | 7/1988 | Lange |
| 4,763,985 A | 8/1988 | Bingham |

(Continued)

FOREIGN PATENT DOCUMENTS

| CN | 102636827 | 8/2012 |
|---|---|---|
| EP | 447115 | 9/1991 |

(Continued)

OTHER PUBLICATIONS

Aran, "Tailoring the Swelling and Glass-Transition Temperature of Acrylonitrile/Hydroxyethyl Acrylate Copolymers", Journal of Applied Polymer Science, 2010, vol. 116, pp. 628-635.
Brandrup, J., Polymer Handbook, 4$^{th}$ Edition, J. Wiley and Sons, 1999.
Chopra, Thin Film Phenomena, 750 (1969).
Hawley's Condensed Chemical Dictionary, R. J. Lewis Sr. Ed., 12$^{th}$ Ed., Van Nostrand Reinhold Co., New York, NY (1993).
Sideridou-Karayannidou, "Synthesis and characterization of copolymers of N-vinylcarbazole and N, N-dimethylaminoethyl acrylate," Polymer, 1999, vol. 40, No. 17, pp. 4915-4922.

(Continued)

*Primary Examiner* — Jeffrey C Mullis
(74) *Attorney, Agent, or Firm* — Dena M. Ehrich; Julie Lapos-Kuchar

(57) ABSTRACT

Articles that include at least one application layer; at least one bead bond layer (10); a layer of optical elements (20) that are partially embedded in the at least one bead bond layer (10); and at least one reflective layer (30) that is located functionally between the layer of optical elements (20) and the bead bond layer (10), wherein the at least one bead bond layer (10), the at least one application layer, or both comprise a cured product of an adhesive compositions that include polymerized units of one or more (meth)acrylate ester monomers derived from an alcohol containing 1 to 14 carbon atoms; at least one of urethane acrylate polymer or at least one acrylic copolymer; and at least one initiator.

19 Claims, 4 Drawing Sheets

(56) References Cited

U.S. PATENT DOCUMENTS

| | | | |
|---|---|---|---|
| 4,772,511 | A | 9/1988 | Wood |
| 4,894,259 | A | 1/1990 | Kuller |
| 4,931,414 | A | 6/1990 | Wood |
| 5,200,262 | A | 4/1993 | Li |
| 5,283,101 | A | 2/1994 | Li |
| 5,506,279 | A | 4/1996 | Babu |
| 5,902,836 | A | 5/1999 | Bennett |
| 7,307,115 | B2 | 12/2007 | Husemann |
| 7,307,155 | B2 | 12/2007 | Elliu |
| 7,385,020 | B2 | 6/2008 | Anderson |
| 8,137,807 | B2 | 3/2012 | Clapper |
| 9,217,816 | B2 | 12/2015 | Zhang |
| 9,260,603 | B2 | 2/2016 | Vilasagar |
| 9,334,423 | B2 | 5/2016 | Tobing |
| 9,431,560 | B2 | 8/2016 | Oda |
| 9,447,309 | B2 | 9/2016 | Fornof |
| 2003/0211299 | A1 | 11/2003 | Rajan |
| 2009/0270003 | A1 | 10/2009 | Anderson |
| 2010/0055418 | A1 | 3/2010 | Takamatsu |
| 2011/0292508 | A1 | 12/2011 | Huang |
| 2012/0231269 | A1 | 9/2012 | Nakagawa |
| 2012/0288692 | A1 | 11/2012 | Broyles |
| 2014/0118827 | A1* | 5/2014 | Zhang .................... A41D 13/01 359/518 |
| 2014/0142210 | A1 | 5/2014 | Zhang |
| 2016/0096982 | A1 | 4/2016 | Fornof |
| 2016/0289440 | A1 | 10/2016 | Janoski |

FOREIGN PATENT DOCUMENTS

| | | |
|---|---|---|
| JP | 2007-277050 | 10/2007 |
| WO | WO 2005-023913 | 3/2005 |
| WO | WO 2009-120412 | 10/2009 |
| WO | WO 2015-140407 | 9/2015 |
| WO | WO 2015-194531 | 12/2015 |
| WO | WO 2015-195433 | 12/2015 |
| WO | WO 2016-053734 | 4/2016 |
| WO | WO 2016-094112 | 6/2016 |
| WO | WO 2016-094277 | 6/2016 |
| WO | WO 2016-094280 | 6/2016 |
| WO | WO 2017-112453 | 6/2017 |
| WO | WO 2017-112458 | 6/2017 |
| WO | WO 2017-112468 | 6/2017 |
| WO | WO 2017-112537 | 6/2017 |
| WO | WO 2017-214007 | 12/2017 |
| WO | WO 2018-152467 | 8/2018 |
| WO | WO 2018-152469 | 8/2018 |
| WO | WO 2018-236783 | 12/2018 |

OTHER PUBLICATIONS

International Search Report for PCT International Application No. PCT/US2018/038160, dated Aug. 27, 2018, 3 pages.
International Search Report for PCT International Application No. PCT/IB2018/054778, dated Oct. 17, 2018, 6 pages.

* cited by examiner

ARTICLES HAVING ADHESIVE LAYERS INCLUDING URETHANE ACRYLATE POLYMER OR ACRYLATE COPOLYMER

SUMMARY

Disclosed are articles that include at least one application layer; at least one bead bond layer; a layer of optical elements that are partially embedded in the at least one bead bond layer; and at least one reflective layer that is located functionally between the layer of optical elements and the bead bond layer, wherein the at least one bead bond layer, the at least one application layer, or both comprise a cured product of an adhesive composition that includes polymerized units of one or more (meth)acrylate ester monomers derived from an alcohol containing 1 to 14 carbon atoms; at least one of urethane acrylate polymer or at least one acrylic copolymer; and at least one initiator.

Disclosed are articles that include at least one application layer; at least one bead bond layer; a layer of optical elements that are partially embedded in the at least one bead bond layer; and at least one reflective layer that is located functionally between the layer of optical elements and the bead bond layer, wherein the at least one application layer comprises a cured product of an adhesive composition comprising: polymerized units of one or more (meth)acrylate ester monomers derived from an alcohol containing 1 to 14 carbon atoms; at least one acrylic copolymer; and at least one initiator.

Disclosed are articles that include at least one application layer; at least one bead bond layer; a layer of optical elements that are partially embedded in the at least one bead bond layer; and at least one reflective layer that is located functionally between the layer of optical elements and the bead bond layer, wherein the at least one bead bond layer comprises a cured product of an adhesive composition comprising: polymerized units of one or more (meth)acrylate ester monomers derived from an alcohol containing 1 to 14 carbon atoms; at least one urethane acrylate polymer; and at least one initiator.

The above summary of the present disclosure is not intended to describe each disclosed embodiment or every implementation of the present disclosure. The description that follows more particularly exemplifies illustrative embodiments. In several places throughout the application, guidance is provided through lists of examples; examples can be used in various combinations. In each instance, the recited list serves only as a representative group and should not be interpreted as an exclusive list.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
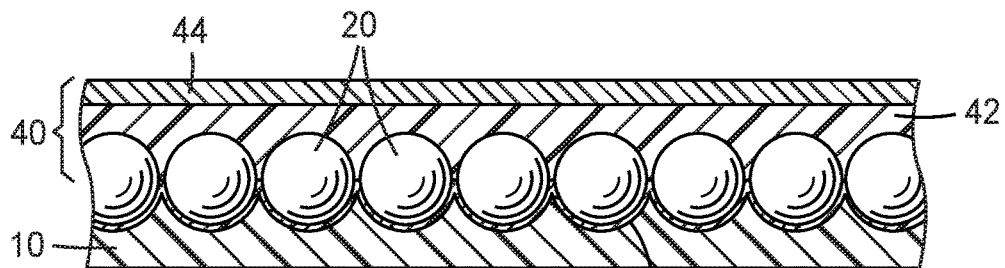
FIG. 1 shows a cross-sectional view of an embodiment of an intermediate article of this disclosure.

Disclosed articles include at least one layer that includes a composition that can function as an adhesive. The term "adhesive" can refer to polymeric compositions useful to adhere together to adherends. Examples of types of adhesives are pressure sensitive adhesives, heat activated adhesives and laminating adhesives.

Pressure sensitive adhesive compositions are well known to those of ordinary skill in the art to possess properties including the following: (1) aggressive and permanent tack at room temperature, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

Heat activated adhesives are non-tacky at room temperature but become tacky and capable of bonding to a substrate at elevated temperatures. These adhesives usually have a glass transition temperature (Tg) or melting point (Tm) above room temperature. When the temperature is elevated above the Tg or Tm, the storage modulus usually decreases and the adhesive become tacky.

Laminating adhesives (also sometimes referred to as contact adhesives) are adhesives designed to form bonds to two substrates immediately after dispensing. Once the adhesive has been dispensed, there is a limited time, sometimes referred to as "open time" in which the adhesive can form a bond to two substrates. Once the open time has elapsed, the laminating adhesive is no longer capable of forming adhesive bonds. Examples of laminating adhesives are hot melt adhesives, solutions or dispersions of polymeric materials or materials curable to form polymeric materials in a liquid medium, and curable adhesives. The laminating adhesive is coated onto a substrate, a second substrate is contacted to the adhesive surface and the formed three layer construction is cooled, dried, and/or cured to form a laminate. Examples of laminating adhesives include the glue sticks used in hot glue guns (which are hot melt types of adhesives that form bonds upon cooling), casein glues, sometimes called "white glue", (which are water-borne dispersions that form bonds upon drying), and cyanoacrylate adhesives (which cure to form bonds upon exposure to air).Unless otherwise indicated, the terms "transparent" and "optically transparent" are used interchangeably and refer to an article, film or adhesive that has a high light transmittance over at least a portion of the visible light spectrum (about 400 to about 700 nm).

Disclosed compositions include polymerized units of one or more (meth)acrylate ester monomers, at least one of urethane acrylate polymer or acrylic copolymer; and at least one initiator.

(Meth)acrylate Ester Monomers

Disclosed compositions include polymerized units of one or more (meth)acrylate ester monomers derived from a (e.g. non-tertiary) alcohol containing 1 to 14 carbon atoms and in some embodiments an average of 4 to 12 carbon atoms Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol; 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, and the like.

Compositions can also be described as including polymerized units of one or more low Tg (meth)acrylate monomers, e.g., a (meth)acrylate monomer when reacted to form a homopolymer has a Tg no greater than 0° C. In some embodiments, the low Tg monomer has a $T_g$ no greater than −5° C., or no greater than −10° C. The Tg of these homopolymers is often greater than or equal to −80° C., greater than or equal to −70° C., greater than or equal to −60° C., or greater than or equal to −50° C.

The low Tg monomer may have the formula:

$$H_2C=CR^1C(O)OR^8$$

wherein $R^1$ is H or methyl and $R^8$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof. The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

Exemplary low Tg monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate (Tg=−70° C.), isononyl acrylate, decyl acrylate, isodecyl acrylate, lauryl acrylate, isotridecyl acrylate, octadecyl acrylate, and dodecyl acrylate.

Low Tg heteroalkyl acrylate monomers include, but are not limited to, 2-methoxyethyl acrylate and 2-ethoxyethyl acrylate.

In some embodiments, the film and composition comprises polymerized units of at least one low Tg monomer(s) having an alkyl group with 6 to 20 carbon atoms. In some embodiments, the low Tg monomer has an alkyl group with 7 or 8 carbon atoms. Exemplary monomers include, but are not limited to, 2-ethylhexyl (meth)acrylate, isooctyl (meth)acrylate, n-octyl (meth)acrylate, 2-octyl (meth)acrylate, isodecyl (meth)acrylate, and lauryl (meth)acrylate.

In some embodiments, the monomer is an ester of (meth)acrylic acid with an alcohol derived from a renewable source. A suitable technique for determining whether a material is derived from a renewable resource is through $^{14}C$ analysis according to ASTM D6866-10, as described in US2012/0288692. The application of ASTM D6866-10 to derive a "bio-based content" is built on the same concepts as radiocarbon dating, but without use of the age equations. The analysis is performed by deriving a ratio of the amount of organic radiocarbon ($^{14}C$) in an unknown sample to that of a modern reference standard. The ratio is reported as a percentage with the units "pMC" (percent modern carbon).

One suitable monomer derived from a renewable source is 2-octyl (meth)acrylate, as can be prepared by conventional techniques from 2-octanol and (meth)acryloyl derivatives such as esters, acids and acyl halides. The 2-octanol may be prepared by treatment of ricinoleic acid, derived from castor oil, (or ester or acyl halide thereof) with sodium hydroxide, followed by distillation from the co-product sebacic acid. Other (meth)acrylate ester monomers that can be renewable are those derived from ethanol and 2-methyl butanol. In some embodiments, the film and composition comprises a bio-based content of at least 10, 15, 20, 25, 30, 35, 40, 45, 50, 55 or 60 wt-% using ASTM D6866-10, method B.

Disclosed compositions typically comprise at least 10, 15, 20 or 25 wt-% of polymerized units of monofunctional alkyl (meth)acrylate monomer having a Tg of less than 0° C., based on the total weight of the polymerized units (i.e. excluding inorganic filler or other additives). The film and composition typically comprises no greater than 60, 55, 50, 45, or 40 wt-% of polymerized units of monofunctional alkyl (meth)acrylate monomer having a Tg of less than 0° C., based on the total weight of the polymerized units.

When disclosed compositions are free of unpolymerized components such an inorganic filler and additives, the wt-% of specified polymerized units is approximately the same as the wt-% of such polymerized units present in the total composition. However, when the composition comprises unpolymerized components, such as inorganic filler or other unpolymerizable additive the total composition can comprise substantially less polymerized units. In general, the total amount of unpolymerizable additives may range up to 25 wt-%. Thus, in the case of compositions comprising such unpolymerizable additives the concentration of specified polymerized units can be as much as 5, 10, 15, 20, 25 wt-% less, depending on the total concentration of such additives. For example, when the film or composition comprises 20 wt-% inorganic filler, the concentration of low Tg monofunctional alkyl (meth)acrylate monomer may be 20% less, i.e. at least 8 wt-%, 12 wt-% etc.

Disclosed compositions can include at least one high Tg monomer, e.g., a (meth)acrylate monomer when reacted to form a homopolymer has a Tg greater than 0° C. The high Tg monomer more typically has a Tg greater than 5° C., 10° C., 15° C., 20° C., 25° C., 30° C., 35° C., or 40° C.

In some embodiments, disclosed compositions can include at least one high Tg monofunctional alkyl (meth)acrylate monomers including for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, norbornyl (meth)acrylate, benzyl methacrylate, 3,3,5 trimethylcyclohexyl acrylate, cyclohexyl acrylate, N-octyl acrylamide, and propyl methacrylate or combinations.

In some embodiments, the film and composition comprises at least 1, 2, or 3 wt-% up to 35 wt-% of polymerized units of a monofunctional alkyl (meth)acrylate monomer having a Tg greater than 40° C., 50° C., 60° C., 70° C., or 80° C. based on the total weight of the polymerized units (i.e. excluding inorganic filler or other additives).

The Tg of the homopolymer of various monomers is known and is reported in various handbooks. The following table sets forth the Tg of some illustrative monomers as reported (unless specified otherwise) in *Polymer Handbook*, 4th edition, edited by J. Brandrup, E. H. Immergut, and E. A. Grulke, associate editors A. Abe and D. R. Bloch, J. Wiley and Sons, New York, 1999.

TABLE 1

Glass Transition Temperature (Tg) of Monomers

|  | Tg, °C. |  | Tg, °C. |
| --- | --- | --- | --- |
| Methyl methacrylate | 105 | Methacrylic acid | 223 |
| Isobutyl methacrylate | 53 | 2-hydroxyethyl acrylate | 4 (b) |
| Hexyl methacrylate | −5 | 2-hydroxyethyl methacrylate | 85 |
| Methyl acrylate | 10 | N-vinyl carbazole | 212 (a) |
| Butyl acrylate | −54 | N,N-dimethyl acrylamide | 89 |
| 2-octyl acrylate | −45 | N-vinyl pyrrolidone | 54 |
| 2-ethylhexyl acrylate | −50 | N,N-Dimethylamino ethyl acrylate | −39 (a) |
| Isobornyl acrylate | 94 | N,N-Dimethylamino ethyl methacrylate | 19 |
| Acrylic acid | 106 |  |  |

(a) I. Sideridou-Karayannidou and G. Seretoudi, Polymer, Vol. 40, Issue 17, 1999, pp. 4915-4922.
(b) B. Aran, M. Sankir, E. Vargun, N. D. Sankir, and A. Usanmaz; *Journal of Applied Polymer Science*, Wiley Periodicals, Inc., A Wiley Company, 2010, Vol. 116, pp. 628-635

Urethane Acrylate Polymer

Disclosed compositions and articles including such compositions include either a urethane acrylate polymer or an acrylic copolymer. In some embodiments, disclosed compositions and articles including such compositions can include at least one urethane acrylate (also referred to as urethane (meth)acrylate) polymer. Urethane acrylate polymers include both a urethane polymeric group and an acrylate group. In some embodiments, the urethane acrylate polymers are monofunctional. In some embodiments, a particular urethane acrylate polymer or polymers can be chosen based on whether or not it would be compatible with the composition. For example, in a composition that includes ethyl hexyl acrylate (EHA), "GENOMER" 4188/EHA may be useful because it includes EHA, thereby aiding in compatibility.

Illustrative commercially available urethane acrylate polymers are available from a number of manufactures, including for example Rahn AG (Zurich) and Allnex (Belgium). Specific commercially available examples include those under the following trade designations GENOMER 4188/EHA, GENOMER 4188/M22, GENOMER 4205, GENOMER 4215, GENOMER 4215/M22, GENOMER 4217, GENOMER 4230, GENOMER 4247, GENOMER 4256, GENOMER 4267, GENOMER 4269/M22, GENOMER 4297, GENOMER 4302, GENOMER 4312, GENOMER 4316, GENOMER 4355, GENOMER 4379/W, GENOMER 4383/W, GENOMER 4425, GENOMER 4590/PP, GENOMER 4622 and GENOMER 4690 (from Rahn); and products having the trade designation name EBECRYL (from Allnex). In some specific illustrative embodiments, GENOMER 4188/EHA can be utilized.

Disclosed compositions can include various amounts of urethane acrylate polymer. For example, in some embodiments, disclosed compositions can include not less than 0.1 wt-%, not less than 1 wt-%, not less than 5 wt-%, not less than 10 wt-%, not less than 15 wt-%, or not less than 20 wt-% based on the total weight of the composition. For example, in some embodiments disclosed compositions can include not greater than 50 wt-%, not greater than 40 wt-%, or not greater than 30 wt-% urethane acrylate polymer based on the total weight of the composition.

In some embodiments, disclosed articles include a bead bond layer (discussed below) that includes a cured product of a composition that contains a urethane acrylate polymer. In some embodiments, disclosed articles include an application layer and a bead bond layer (discussed below) that includes a cured product of a composition that contains a urethane acrylate polymer.

Acrylate Copolymers

Disclosed compositions and articles including such compositions include either a urethane acrylate polymer or an acrylic copolymer. In some embodiments, disclosed compositions and articles including such compositions can include at least one acrylic copolymer. Acrylic copolymers can be block copolymers, random copolymers, or combinations thereof. In some embodiments, useful acrylic copolymers include butyl acrylate, methyl methacrylate, polyvinyl butyral, polyvinyl acetate, cellulose acetate, ACM (a copolymer of acrylic acid ester and 2-chloroethyl vinyl ether) containing chlorine, ANM (a copolymer of acrylic acid ester and acrylonitrile) without chloride, or combinations thereof. In some embodiments, a particular acrylic copolymer or copolymers can be chosen based on whether or not it would be compatible with the composition.

In some embodiments, illustrative commercially available products that can be used as acrylic copolymers can include, for example those available from Kuraray America Inc.

Disclosed compositions can include various amounts of the at least one acrylic copolymer. For example, in some embodiments, disclosed compositions can include not less than 0.1 wt-%, not less than 1 wt-%, not less than 5 wt-%, not less than 10 wt-%, not less than 15 wt-%, or not less than 20 wt-% based on the total weight of the composition. For example, in some embodiments disclosed compositions can include not greater than 30 wt-%, not greater than 25 wt-%, not greater than 22 wt-%, or not greater than 20 wt-% of at least one acrylic copolymer based on the total weight of the composition.

In some embodiments, disclosed articles include an application layer that includes a cured product of a composition that contains at least one acrylic copolymer. In some embodiments, disclosed articles include both a bead bond layer and an application layer that includes a cured product of a composition that contains at least one acrylic copolymer.

Initiator

Disclosed compositions also include a least one initiator to initiate polymerization and/or crosslinking of the composition. In some embodiments, the at least one initiator can be an actinic radiation activated initiator. In some embodiments, the at least one initiator can be a thermal initiator. Illustrative actinic radiation activated initiators can include photoinitiators.

Useful photoinitiators include benzoin ethers such as benzoin methyl ether and benzoin isopropyl ether; substituted acetophenones such as 2,2-dimethoxy-2-phenylacetophenone photoinitiator, available the trade designation IRGACURE 651 or ESACURE KB-1 photoinitiator (Sartomer Co., West Chester, Pa.), and dimethylhydroxyacetophenone; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl)oxime. Particularly preferred among these are the substituted acetophenones.

Preferred photoinitiators are photoactive compounds that undergo a Norrish I cleavage to generate free radicals that can initiate by addition to the acrylic double bonds. The photoinitiator can be added to the mixture to be coated after the polymer has been formed, e.g., photoinitiator can be added to the composition. Such polymerizable photoinitiators are described, for example, in U.S. Pat. Nos. 5,902,836 and 5,506,279 (Gaddam et al.).

Such photoinitiators are typically present in an amount of from 0.1 to 1.0 wt-% based on the total weight of the composition.

Optional Components

In some disclosed embodiments, compositions can also include other optional components.

One such optional component includes one or more polar functional monomers. Such polar functional monomers may aid in compatibilizing the polyvinyl acetal (e.g. butyral) resin with the (meth)acrylate ester monomer. In some embodiments, the polar functional monomers may have a Tg greater than 0° C., yet the Tg may be less than the high Tg monofunctional alkyl (meth)acrylate monomer.

Representative polar functional monomers include for example acid-functional monomers, hydroxyl functional monomers, nitrogen-containing monomers, and combinations thereof.

In some embodiments, disclosed compositions can include polymerized units of an acid functional monomer (a subset of high Tg monomers), where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methyl-propanesulfonic acid, vinylphosphonic acid, and mixtures thereof.

Due to their availability, acid functional monomers are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids.

In some embodiments, the film and composition comprises non-acid-functional polar monomer.

One class of non-acid-functional polar monomers includes nitrogen-containing monomers. Representative examples include N-vinylpyrrolidone; N-vinylcaprolactam; acrylamide; mono- or di-N-alkyl substituted acrylamide; t-butyl acrylamide; dimethylaminoethyl acrylamide; and N-octyl acrylamide.

Another class of non-acid-functional polar monomers includes alkoxy-functional (meth)acrylate monomers. Representative examples 2-(2-ethoxyethoxy)ethyl (meth)acrylate, 2-ethoxyethyl (meth)acrylate, 2-hydroxyethyl (meth)acrylate, 2-methoxyethoxyethyl (meth)acrylate, 2-methoxyethyl methacrylate, and polyethylene glycol mono(meth)acrylates.

In some embodiments, polar functional monomers can include acrylic acid, 2-hydroxyethyl (meth)acrylate; N,N-dimethyl acrylamide, N-vinylpyrrolidinone, or combinations thereof.

Polar functional monomers can be present in disclosed compositions in various useful amounts. In some embodiments, polar functional monomers can be present in disclosed compositions in an amount that is not less than 1 wt-%, 1.5 wt%, or 2 wt-% based on the total weight of the composition. In some embodiments, polar functional monomers can be present in disclosed compositions in an amount that is not greater than 15 wt-%, 12 wt-%, or 10 wt-% based on the total weight of the composition.

Another optional component includes adhesion promoters. Disclosed compositions need not, but can include adhesion promoters. In some embodiments, disclosed compositions do not include adhesion promoters and in some embodiments disclosed compositions do include adhesion promoters. In some embodiments, disclosed compositions have desirable adhesion properties without the need for adhesion promoters.

Illustrative adhesion promoters can include silane coupling agents. Illustrative specific examples of the silane coupling agent can include aminosilanes such as N-β(aminoethyl)γ-aminopropyltrimethoxysilane, γ-aminopropyltrimethoxysilane, γ-aminopropyltriethoxysilane, N-phenyl-γ-aminopropyltrimethoxysilane, etc., thiolsilane, epoxysilane, ureasilane and the like. The amount of the optional coupling agent contained in the composition is usually within a range from 0.02 to 5% by weight, from 0.05 to 3% by weight, or from 0.1 to 2% by weight, based on the total weight of the composition.

Additional optional components can include components such as fillers, rheology modifiers, pigments, dyes, or combinations thereof.

Articles

Also disclosed herein are articles that include or are made using disclosed compositions.

Disclosed compositions can be useful in forming virtually any types of articles. In some embodiments, illustrative types of articles can include, for example layered articles. Disclosed compositions and articles made using disclosed compositions may offer advantageous properties including, for example typically adhesive type properties, wearability, optical properties, flexibility, washability, or any combinations thereof.

In some embodiments, articles made using or that include disclosed compositions can include retroreflective articles. A wide variety of articles that incorporate the phenomenon of retroreflectivity have been developed for a wide array of uses. Retroreflective articles have the ability to return a substantial portion of incident light back towards the light source. This unique ability has promoted widespread use of retroreflective safety articles. Besides traffic and warning signs and the like, a wide variety of clothing and similar articles such as backpacks, and the like have incorporated retroreflective articles into them. Persons who work or exercise near motor vehicle traffic need to be conspicuously visible so that they do not get struck by passing motor vehicles. When retroreflective articles are worn, the retroreflectivity highlights a person's presence by retroreflecting light from motor vehicle headlamps.

Retroreflective articles typically have an optical lens element layer, a polymeric bead bond layer, a reflective layer, and may also have a substrate layer. The optical lens elements commonly are microsphere beads that are partially embedded in the polymeric bead bond layer. The reflective layer typically is aluminum, silver, or a dielectric mirror that usually is disposed on the embedded portions of the microsphere beads. Light striking the front surface of the retroreflective article passes through the microsphere beads and is reflected by the reflective layer to re-enter the microsphere beads where the light's direction is then altered to travel back towards the light source. Thus, for example, when a vehicle's headlamps strike a retroreflective article, some of the light from the headlamps is reflected back to the driver of the vehicle.

It is generally not necessary, or even desirable, that an entire worn article be retroreflective, so retroreflective appliques are often used. These retroreflective appliques can then be attached to an article of clothing or other article to prepare a retroreflective article. In some instances, retroreflective appliques have been made by partially embedding a microsphere layer in a thermoplastic carrier web, applying a reflective material over the microsphere beads' protruding portions, and then forming a bead bond layer over the coated microsphere beads. Often a hot melt adhesive is applied on the bead bond layer's back surface, and a release liner is placed over the adhesive until the applique is secured to a substrate. This type of applique, a transfer film applique, is supplied to a garment assembler in this form, and the garment assembler secures the applique to an article of clothing by removing the release liner and laminating the applique to an outer surface of the article of clothing. The carrier is then separated from the applique to expose the microsphere beads so that the applique can retroreflect light.

A different type of applique, referred to herein as a fixed applique, consists of a retroreflective article permanently applied to a fabric or material with the bead layer exposed. The fixed applique can be sewn onto, or otherwise attached to, a garment or other item.

A variety of articles are retroreflective or have retroreflective appliques that combine retroreflectivity with bright or fluorescent colors. Often articles have strips of retroreflective material and adjacent stripes of bright or fluorescent colors. In this way the articles provide high visibility in daylight due to the brightly colored or fluorescent strips and also are retroreflective for high visibility at night. An example is an article having two fluorescent yellow strips with a retroreflective strip located between the fluorescent yellow strips.

Retroreflectivity of an article can be expressed in terms of its coefficient of retroreflectivity ($R_A$)

$$R_A = E_r \times \frac{d^2}{E_S} \times A$$

$R_A$=retroreflective intensity
$E_r$=illumination incident upon the receiver
$E_s$=illumination incident upon a plane perpendicular to the incident ray of the specimen position, measured in the same units as $E_r$
d=distance from the specimen to the projector
A=area of the test surface The coefficient of retroreflectivity ($R_A$) is further described in U.S. Pat. No. 3,700,305 (Bingham). In at least some embodiments, the articles of the present disclosure have an $R_A$ of at least 50, in other embodiments an $R_A$ of at least 100, in other embodiments, an $R_A$ of at least 200, and in other embodiments, an $R_A$ of at least 300.

Another aspect of retroreflective articles is their ability to maintain retroreflectivity and color quality after being washed a number of times. In at least some embodiments, articles of the present disclosure have a minimum $R_A$ value of at least 100 after fifty washes using ISO 6330 Method 2A.

Disclosed herein are methods of preparing retroreflective articles. These methods comprise providing a polymeric carrier layer with a first major surface and a second major surface, providing transparent microspheres, partially embedding the transparent microspheres into the first major surface of the polymeric carrier layer such that the beads at least partially protrude from the first major surface of the polymeric carrier layer to form a layer of microspheres, depositing one or more reflective layers on at least a portion of the first major surface of the polymeric carrier layer and the layer of microspheres, applying a composition to the layer of microspheres, and curing the composition to form a bead bond layer. The composition can be an adhesive composition disclosed herein or any adhesive composition. The thus formed article can be considered an intermediate article and can be transformed into a retroreflective article by removing the polymeric carrier layer.

In some embodiments, depositing one or more reflective layers on at least a portion of the first major surface of the polymeric carrier layer and the layer of microspheres comprises depositing a layer of reflective metal to a selected portion of the layer of microspheres. This selective deposition can be achieved in a variety of ways, for example, portions of the surface can be masked to prevent the deposition of the metal. In other embodiments, depositing one or more reflective layers on at least a portion of the first major surface of the polymeric carrier layer comprises depositing one or more layers of dielectric material on a selected portion of the layer of microspheres. Generally, multiple layers of dielectric material are deposited to form the dielectric reflecting layer, which is sometimes called a dielectric mirror. A combination of these types of deposition can also be used.

A wide variety of materials are suitable for use in the methods described above. Examples of these materials are described below.

A wide variety of materials and combinations of materials are suitable for the polymeric carrier layer. In many embodiments the polymeric carrier layer is a thermoplastic polymeric carrier layer, but in other embodiments the polymeric carrier layer may comprise an elastomeric polymeric carrier layer, and in some embodiments, may even be a pressure sensitive adhesive or a heat activated adhesive. Typically, the polymeric carrier layer comprises a thermoplastic polymeric carrier layer. In some embodiments, the thermoplastic polymeric carrier layer may be a standalone layer; in other embodiments the thermoplastic polymeric carrier layer may comprise a coating of thermoplastic polymeric carrier material on the first major surface of a sheet. The sheet may comprise, for example, paper, a polymeric film, and the like. Examples of useful polymeric carrier materials include polyvinyl chloride, polysulfones, polyalkylenes such as polyethylene, polypropylene and polybutylene, polyesters, and the like.

A layer of partially embedded transparent microspheres is formed on the surface of the polymeric carrier layer. The monolayer of transparent microspheres can be assembled by cascading transparent microspheres onto the polymeric carrier layer, which secures the microspheres in a desired temporary assignment. Typically, the polymeric carrier layer can be heat softened. The microspheres are generally packed as closely as possible, ideally in their closest hexagonal arrangement, to achieve very good retroreflective brightness and may be so arranged by any convenient application process, such as printing, screening, cascading, or hot rolling. Upon cooling, the polymeric carrier layer retains the microspheres in a desired arrangement.

Typically, the transparent microspheres are substantially spherical in shape in order to provide the most uniform and efficient retroreflection. The microspheres are substantially transparent so as to minimize absorption of light so that a large percentage of the incident light is retroreflected. The microspheres often are substantially colorless but may be tinted or colored in some other fashion.

The microsphere beads may be made from glass, a non-vitreous ceramic composition, or a synthetic resin. Glass and ceramic microspheric beads are particularly suitable because they tend to be harder and more durable than microsphere beads made from synthetic resins. Examples of microsphere beads that may be used are described in the following U.S. Pat. Nos. 1,175,224, 2,461,011, 2,726,161, 2,842,446, 2,853,393, 2,870,030, 2,939,797, 2,965,921, 2,992,122, 3,468,681, 3,946,130, 4,192,576, 4,367,919, 4,564,556, 4,758,469, 4,772,511, and 4,931,414.

The microspheres typically have an average diameter in the range of about 30 to 200 micrometers. Microspheres smaller than this range tend to provide lower levels of retroreflection, and microspheres larger than this range may impart an undesirably rough texture to the appliqué or may undesirably reduce its flexibility. The microspheres typically have a refractive index of about 1.7 to about 2.0, the range typically considered to be useful in exposed lens retroreflective products.

As described above, a reflective layer is applied to at least a portion of the microsphere layer. The reflective layer may be a reflective metal layer, a dielectric reflective layer, or a combination thereof. The reflective layer can be described as being functionally located between the layer of optical elements and the bead bond layer The reflective metal layer is a specularly reflective metal that forms a reflective metal layer coating. This technique facilitates the arrangement of the retroreflective elements (optical elements and reflective material) in substantially uniform direction for retroreflection. The size of the retroreflective elements, i.e. the surface portion of the microspheres covered with the reflective material, may be controlled in part by controlling the depth to which the microspheres are embedded in the polymer prior to applying the reflective material.

The reflective material can be a layer comprising an elemental metal that is capable of specularly reflecting light. A variety of metals may be used to provide a specular reflective metal layer. These include aluminum, silver, chromium, gold, nickel, magnesium, and the like, in elemental form, and combinations thereof. Aluminum and silver are particularly suitable metals for use in a reflective layer from a performance standpoint. The metal may be a continuous coating such as is produced by vacuum-deposition, vapor coating, chemical-deposition, or electroless plating. It is to be understood that in the case of aluminum, some of the metal may be in the form of the metal oxide and/or hydroxide. Aluminum and silver metals are desirable because they tend to provide the highest retroreflective brightness. The metal layer should be thick enough to reflect incoming light. Typically, the reflective metal layer is about 50 to 150 nanometers thick.

The dielectric reflective layer is a dielectric mirror. The dielectric mirror may be similar to known dielectric mirrors disclosed in U.S. Pat. Nos. 3,700,305 and 4,763,985 to Bingham. The dielectric mirrors typically are multi-layer constructions, with a layer having a refractive index $n_2$ and a layer of transparent material disposed thereon which has a refractive index $n_1$, and the opposite face of the transparent material (having a refractive index $n_1$) is in contact with a material having a refractive index $n_3$, where both $n_2$ and $n_3$ have a refractive index of at least 0.1, more typically at least 0.3, higher or lower than $n_1$. The transparent material is a layer that typically has an optical thickness corresponding to odd numbered multiples (that is, 1, 3, 5, 7 . . . ) of about one-quarter wavelength of light in the wavelength range of about 380 to about 1,000 nanometers. Thus, either $n_2 > n_1 < n_3$ or $n_2 < n_1 > n_3$, and the materials on either side of the transparent layer may be either both higher or both lower in refractive index than $n_1$. When $n_1$ is higher than both $n_2$ and $n_3$, $n_1$ is in the 1.7 to 4.9 range, and $n_2$ and $n_3$ are in the 1.2 to 1.7 range. Conversely, when $n_1$ is lower than both $n_2$ and $n_3$, $n_1$ is in the 1.2 to 1.7 range, and $n_2$ and $n_3$ are in the 1.7 to 4.9 range. The dielectric mirror generally comprises a contiguous array of materials, at least one being in layer form, having an alternating sequence of refractive indices. Typically, the contiguous array has from two to seven layers, more typically three to five layers, adjacent to the lens element. A dielectric mirror can provide very good retroreflectivity, although, it typically is not as efficient a reflector as a reflective metal layer.

Among the many compounds that may be used in providing transparent materials within the desired refractive index range are: high index materials such as CdS, $CeO_2$, CsI, GaAs, Ge, InAs, InP, InSb, $ZrO_2$, $Bi_2O_3$, ZnSe, ZnS, $WO_3$, PbS, PbSe, PbTe, RbI, Si, $Ta_2O_5$, $ZrO_2$, Te, $TiO_2$, low index materials such as cryolite, $Al_2O_3$, $A_1F_3$, $CaF_2$, $CeF_3$, LiF, $MgF_2$, $Na_3$ $AlF_6$, $ThOF_2$, elastomeric copolymers of perfluoropropylene and vinylidene fluoride (refractive index of >>1.38), etc. Other materials are reported in Thin Film Phenomena, K. L. Chopra, page 750, McGraw-Hill Book Company, N.Y., (1969). Particularly suitable dielectric mirrors contain layers of $SiO_2$, $CaF_2$, $MgF_2$, ZnS, $Nb_2O_5$, $Ta_2O_5$, $ZrO_2$, or combinations thereof. In some embodiments, the dielectric reflective layer comprises a layer of $CaF_2$, ZnS, or a combination thereof.

Bead bond layers may contain at least one polymer (typically called a binder material) and may contain additional additives such as a colorant or other optional additives such as UV stabilizers, antioxidants, UV absorbers, property modifiers, performance enhancers, or combinations thereof. Any of the colorants described above (nanopigments, dyes, and pigments) are suitable for use in the bead bond layer.

The polymeric binder material of the bead bond layer may be a polymer including, but not limited to, an elastomer. In this disclosure, an elastomer is defined as a polymer having an ability to be stretched to at least twice its original length and to retract to approximately its original length when released, (definition taken from "Hawley's Condensed Chemical Dictionary", R. J. Lewis Sr. Ed., 12th Ed., Van Nostrand Reinhold Co., New York, N.Y. (1993)). Typically, the polymeric binder material includes a cross-linked or virtually cross-linked elastomer. A cross-linked elastomer means that the polymeric chains of the elastomer are chemically cross-linked to form a three dimensional network which is stabilized against molecular flow. A virtually cross-linked elastomer means that the polymeric chain mobility of the elastomer is greatly reduced by chain entanglement and/or by hydrogen bonding, resulting in an increase in the cohesive or internal strength of the polymer. Examples of such polymer cross-linking include carbon-carbon bond formation such as: free radical bonding between vinyl groups between chains; agent or group coupling such as by vulcanization or reaction with a coupling agent such as a diol in the case of isocyanate or epoxy functionalized polymers; a diisocyanate or an activated ester in the case of amine and alcohol functionalized polymers; and epoxides and diols in the case of carboxylic acid or anhydride functionalized polymers. Examples of such virtual cross-linking include amide hydrogen bonding as is found in polyamides or crystalline and amorphous region interactions as is found in block copolymers of styrene and acrylonitrile.

Illustrative examples of the polymers that may be employed as the binder material in the bead bond layer include: polyolefins; polyesters; polyurethanes; polyepoxides; natural and synthetic rubbers; and combinations thereof. Examples of cross-linked polymers include the foregoing examples of polymers substituted with cross-linkable groups such as epoxide groups, olefinic groups, isocyanate groups, alcohol groups, amine groups or anhydride groups. Multifunctional monomers and oligomers which react with functional groups of the polymers may also be used as cross-linkers.

Specific examples of useful bead bond layer materials are disclosed in U.S. Pat. Nos. 5,200,262 and 5,283,101. In the '262 patent, the bead bond layer comprises one or more flexible polymers having active hydrogen functionalities such as crosslinked urethane-based polymers (for example, isocyanate cured polyesters or one of two component polyurethanes) and one or more isocyanate-functional silane coupling agents. In the '101 patent, the bead bond layer comprises an electron-beam cured polymer selected from the group consisting of chlorosulfonated polyethylenes, ethylene copolymers comprising at least about 70 weight percent polyethylene, and poly(ethylene-co-propylene-co diene) polymers.

Examples of commercially-available polymers that may be used in the bead bond layer include the following: VITEL VPE 3550B and VPE 5833 polyesters available from Bostik, Wauwatosa, Wis.; RHOPLEX HA-8 and NW-1845 acrylic resins available from Dow Chemical; CYDROTHANE a polyurethane available from Cytec Industries, West Patterson, N.J.; ESTANE 5703 and 5715 available from Lubrizol Corporation, Cleveland, Ohio; and NIPOL 1000, available from Zeon Chemicals, Inc., Rolling Meadows, Ill.

The bond layer typically has a thickness of about 50 to 250 micrometers (2 to 10 mils), with thicknesses of about 75 to 200 micrometers (3 to 8 mils) often being particularly suitable. It is to be understood that a bead bond layer having a thickness outside these ranges may be used; however, if the bead bond layer is too thin, in some embodiments, it may not provide sufficient support to the microsphere beads, allowing them to become dislodged.

If colored, the bead bond layer generally includes a desirable amount of colorant to provide supplemental color or depth of color of the polymeric color layer or article. The amount of colorant in the polymeric color layer can depend at least in part on the particular colorant(s) used, the desired color or shade of color, the other components in the polymeric color layer, and combinations thereof.

In some embodiments, the method may further include use of an application layer to the bead bond layer. The application layer can be contacted to the bead bond layer prior to curing, such as the application layer can be contacted to the composition or a disclosed adhesive composition, such that when the composition or disclosed adhesive composition cures the bead bond layer is adhered to the application layer. The application layer can be a single layer or multi-layer article. Examples of suitable application layers include a film layer, a fabric layer, or a non-woven layer.

In other embodiments, the application layer can be contacted to the bead bond layer after curing. Examples of suitable application layers include a layer of adhesive, a film layer, a fabric layer, or a non-woven layer. Examples of suitable adhesives include pressure sensitive adhesives, heat activated adhesives and laminating adhesives. The adhesive layer can be covered by a release liner if desired to protect the adhesive surface from contamination until used. The adhesive layer can be used alone as the application layer or the adhesive layer can be used to adhere the bead bond layer to a wide range of substrates such as films, fabrics and non-wovens. In addition, a wide range of substrates such as films, fabrics and non-wovens can be adhered to the bead bond layer by mechanical means such as by heat lamination. Particularly desirable substrates are fabrics so that the formed article is an article of clothing.

The thus formed articles are sometimes called "intermediate articles". By intermediate articles it is meant articles in which the polymeric carrier layer is attached to the article. The intermediate articles are not themselves retroreflective articles, but become retroreflective articles upon the removal of the polymeric carrier layer.

The intermediate article can be immediately subjected to additional steps to generate the final retroreflective article, or the intermediate article can be stored for later use, shipped to another location, or subjected to additional processing steps such as cutting, attachment to a substrate, and the like. It is often desirable to form this intermediate article, because this intermediate article can be stored, shipped, or processed without exposing the optical elements. Once the optical elements are exposed, even though they contain a bead bond layer, they are subject to potential damage from abrasion, staining and the like. When desired, the polymeric carrier layer can be removed to form the final retroreflective article.

The above methods can be used to prepare a wide variety of retroreflective articles. Disclosed herein are retroreflective articles that comprise a layer of optical elements. The optical elements are transparent microspheres, and at least one reflective layer. The optical elements are embedded in a bead bond layer, where the bead bond layer is a curable composition or a disclosed adhesive composition. The reflective layer may be a reflective metal layer, a dielectric reflective layer, or a combination thereof.

The retroreflective articles have wash durability. By wash durability it is meant that the retroreflective articles of this disclosure are capable of being laundered without losing the desired properties of the article, namely retroreflectivity ($R_A$). Wash durability of retroreflective articles can be described in a variety of different ways. An example of good washing performance was described in US Patent Publication No. 2011/0292508 (Huang et al.), as retaining at least about 100 candelas/lux/meter$^2$ at 5/0.2 angle after being washed 15 times. In some embodiments, the retroreflective article can retain at least about 200 candelas/lux/meter$^2$ at 5/0.2 angle after being washed 15 times. In yet other embodiments, the retroreflective article can retain at least about 300 candelas/lux/meter$^2$ at 5/0.2 angle after being washed 15 times.

In some embodiments, it is desirable that the retroreflective articles have at least a portion of the surface of the article be discontinuous. By discontinuous it is meant that there is a region in the finished retroreflective article that is devoid of all layers from the microsphere bead and barrier material layer and to the bead bond layer. These discontinuities can be beneficial for a variety of reasons. In some embodiments, the discontinuities can form a pattern or design. The pattern or design can be in the form of indicia, logos, etc. In other embodiments, the discontinuities can be arranged either randomly or in a non-continuous pattern. Besides the visual effect of the discontinuities, the discontinuities can provide enhanced breathability for the retroreflective article. By this it is meant that gases, and or moisture can pass through the retroreflective article more easily. An effect of the enhanced breathability is to be more comfortable for a person wearing such an article. This is particularly desirable for construction workers, firefighters, emergency workers, and people exercising.

Retroreflective articles with discontinuous segments can be prepared a variety of different ways. A particularly suitable way involves partially removing optical elements and bead bond layer from portions of one or more segments. This removal can be effected by cutting, scraping, hole-punching, and other suitable mechanical means.

Examples of articles of this disclosure are provided in the Figures. FIG. 1 is a cross sectional depiction of an embodiment of an intermediate article of this disclosure. In FIG. 1, the intermediate article includes bead bond layer 10, transparent microspheres 20, reflective layer 30 and carrier layer 40. Carrier layer 40 includes sheet layer 44 and a coating of thermoplastic polymeric carrier material 42.

Figure 2:
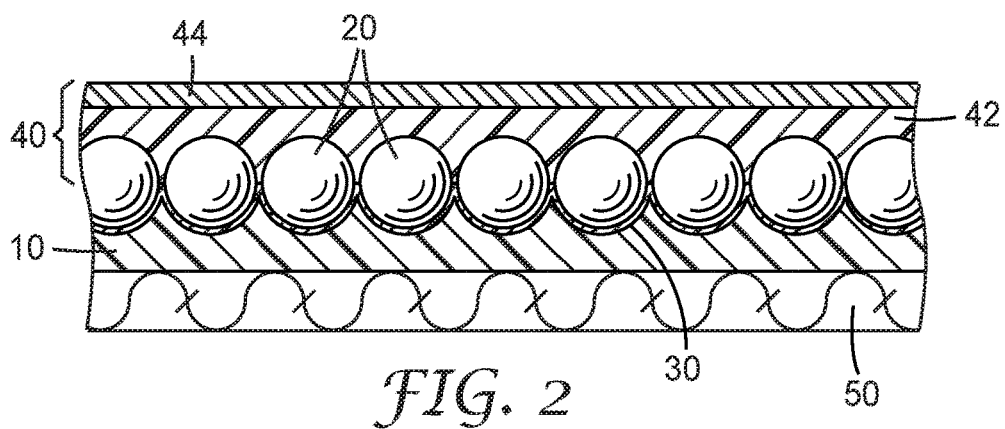
FIG. 2 shows a cross-sectional view of an embodiment of an intermediate article of this disclosure.

FIG. 2 depicts an alternative embodiment of an intermediate article of this disclosure. In FIG. 2, the intermediate article includes bead bond layer 10, transparent microspheres 20, reflective layer 30 and application layer 50. Application layer 50 could be or could include an adhesive, a fabric, or a non-woven.

Figure 3:
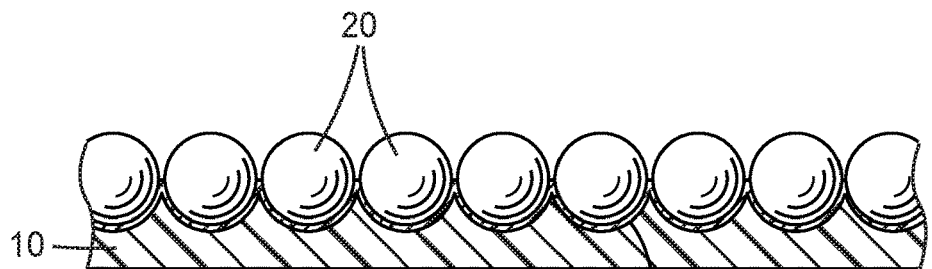
FIG. 3 shows a cross-sectional view of an embodiment of an article of this disclosure.

FIG. 3 depicts the embodiment of FIG. 1 in which the carrier layer 40 has been removed. In FIG. 3, the article includes bead bond layer 10, transparent microspheres 20, and reflective layer 30.

Figure 4:
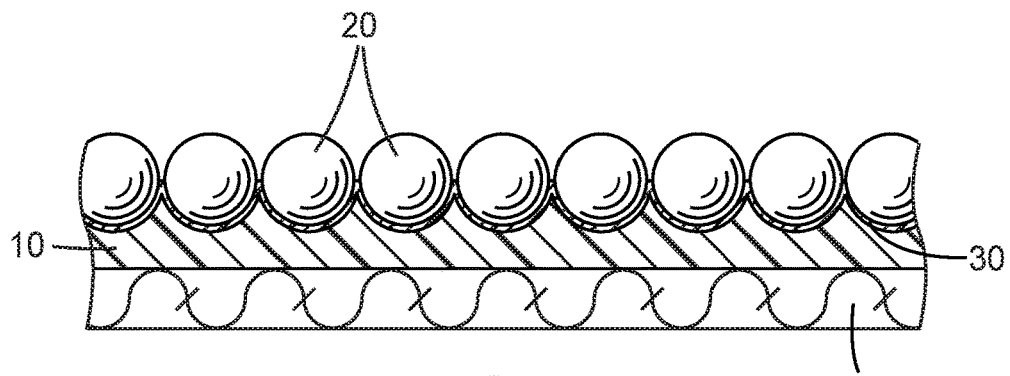
FIG. 4 shows a cross-sectional view of an embodiment of an article of this disclosure.

FIG. 4 depicts the embodiment of FIG. 2 in which the carrier layer 40 has been removed. In FIG. 4, the article includes bead bond layer 10, transparent microspheres 20, reflective layer 30, and application layer 50.

Also disclosed herein are articles of clothing that contain retroreflective appliques of the disclosure. These articles of clothing comprise a fabric with a first major surface and a second major surface, and a retroreflective applique attached to the first major surface of the fabric. The retroreflective applique is the retroreflective article described above. A wide variety of fabrics are suitable.

Transfer film retroreflective appliques and fixed retroreflective applique can be attached to the fabric surface by a wide range of attachment techniques such as mechanical attachment or adhesive attachment. Examples of mechanical attachment techniques include, for example, sewing and heat lamination. In adhesive attachment, an adhesive can be applied to the bead bond layer or a backing layer can be applied to the bead bond layer and an adhesive layer applied to the backing layer. In some embodiments, such adhesives can include disclosed adhesive compositions.

Examples of suitable adhesive layers include (in addition to disclosed adhesive compositions) pressure sensitive adhesives, heat activated adhesives, and laminating adhesives. The adhesive layer may be applied to the bead bond layer or backing layer by coating or by lamination of a formed adhesive layer to the bead bond layer or backing layer. A wide variety of pressure sensitive adhesives are suitable including tackified natural rubbers, synthetic rubbers, tackified styrene block copolymers, polyvinyl ethers, poly (meth) acrylates, polyurethanes, polyureas, poly-alpha-olefins, and silicones. The pressure sensitive adhesive may be covered with a release liner to protect the adhesive prior to adhesion to a substrate.

Heat activated adhesives are very similar to pressure sensitive adhesives but require the application of heat to become tacky. One advantage of heat activated adhesives is that, because they are not tacky at room temperature, they typically do not require a release liner to protect the adhesive layer prior to adhesion to a substrate.

Typically, if a laminating adhesive is used, the adhesive layer is immediately bonded to a substrate to form the adhesive substrate bond. Examples of laminating adhesives include hot melt adhesives, adhesive dispersions and suspensions, and curing adhesives such as cyanoacrylates.

A wide variety of articles of clothing are suitable for attachment of retroreflective appliques. Examples of such articles of clothing include, for example, vests such as the safety vests frequently worn by road construction workers, but also include a wide range of other clothing types. Examples include, shirts, sweaters, jackets, coats, pants, shorts, socks, shoes, gloves, belts, hats, suits, one-piece body garments, and the like.

Figure 5:
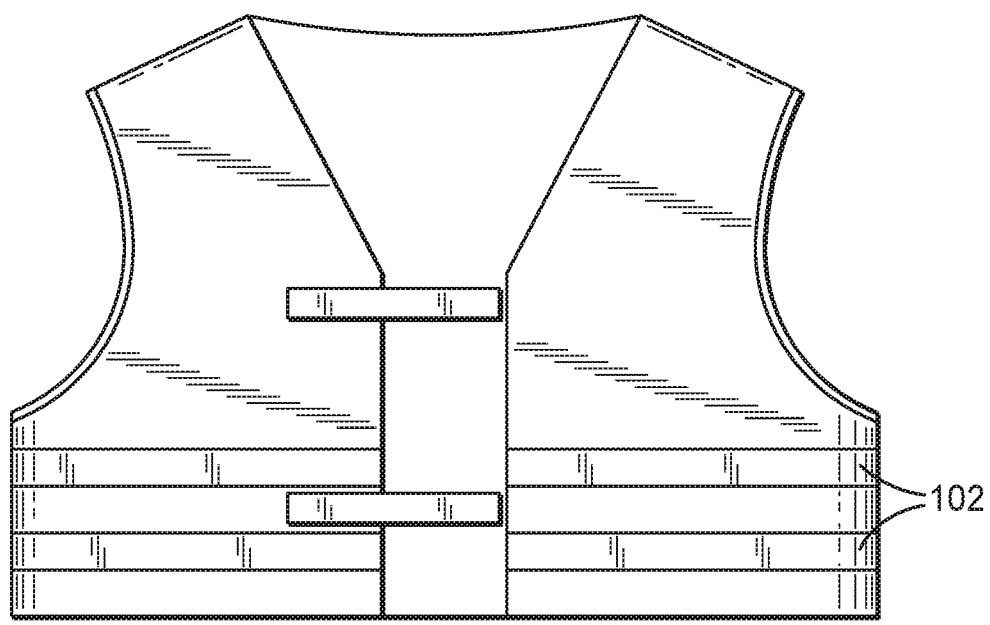
FIG. 5 shows a top view of an embodiment of an article of this disclosure

FIG. 5 depicts an article of clothing of this disclosure. The vest in FIG. 5 includes retroreflective appliqués 102. The retroreflective appliqués 102 can be, for example an article of FIG. 1.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a composition that "comprises" silver may be a composition that "consists of" silver or that "consists essentially of" silver.

As used herein, "consisting essentially of" as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects is present. For example, a "second" substrate is merely intended to differentiate from another substrate (such as a "first" substrate). Use of "first," "second," etc. in the description above and the claims that follow is also not necessarily intended to indicate that one comes earlier in time than the other.

As used herein, "polymer" is inclusive of a homopolymer, copolymer, terpolymer, and the like.

Illustrative disclosed embodiments are provided below.

Some illustrative embodiments include articles comprising at least one application layer; at least one bead bond layer; a layer of optical elements that are partially embedded in the at least one bead bond layer; and at least one reflective layer that is located functionally between the layer of optical elements and the bead bond layer, wherein the at least one bead bond layer, the at least one application layer, or both comprise a cured product of an adhesive composition comprising: polymerized units of one or more (meth)acrylate ester monomers derived from an alcohol containing 1 to 14 carbon atoms; at least one of urethane acrylate polymer or at least one acrylic copolymer; and at least one initiator.

In some embodiments, the alcohol containing 1 to 14 carbon atoms is selected from: esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol; 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, or combinations thereof. In some embodiments, the polymerized units of one or more (meth) acrylate ester monomers are selected from: ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, dodecyl acrylate, and combinations thereof. In some embodiments, the polymerized units of one or more (meth) acrylate ester monomers are selected from: 2-ethylhexyl (meth)acrylate, isooctyl (meth)acrylate, n-octyl (meth)acrylate, 2-octyl (meth)acrylate, isodecyl (meth)acrylate, and lauryl (meth)acrylate and combinations thereof. In some embodiments, at least some of the polymerized units of one or more (meth)acrylate ester monomers derived from an alcohol containing 1 to 14 carbon atoms comprise monomers when reacted to form a homopolymer has a Tg greater than 10° C. In some embodiments, the monomers are selected from: t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, norbornyl (meth)acrylate, benzyl methacrylate, 3,3,5 trimethylcyclohexyl acrylate, cyclohexyl acrylate, N-octyl acrylamide, and propyl methacrylate and combinations thereof. In some embodiments, the composition comprises at least one urethane acrylate polymer. In some embodiments, the composition comprises 0.1 to 50 wt-% of at least one urethane acrylate polymer based on the total weight of the composition, or 20 to 30 wt-% of at least one urethane acrylate polymer based on the total weight of the composition. In some embodiments, the at least one urethane acrylate polymer is a monofunctional urethane acrylate polymer. In some embodiments, the bead bond layer comprises the cured product of the adhesive composition. In some embodiments, the adhesive composition comprises urethane acrylate polymer. In some embodiments, the initiator is a photoinitiator. In some embodiments, the initiator is a thermal initiator Some such specific embodiments can further comprise a polar functional monomer. In some embodiments, the polar functional monomer comprises acrylic acid. In some embodiments, the adhesive composition comprises 1 to 15 wt-% polar functional monomer, 1.5 to 12 wt-% polar functional monomer, or 2 to 10 wt-% polar functional monomer based on the total weight of the adhesive composition. Some such specific embodiments can further comprise one or more silane coupling agents. In some embodiments, the adhesive composition does not include a silane coupling agent. In some embodiments, the at least one application layer comprises the cured product of the adhesive composition. In some embodiments, the adhesive composition comprises at least one acrylic copolymer. In some embodiments, the at least one acrylic copolymer comprises butyl acrylate, methyl methacrylate, polyvinyl butyral, polyvinyl acetate, cellulose acetate, ACM (a copolymer of acrylic acid ester and 2-chloroethyl vinyl ether) containing chlorine, ANM (a copolymer of acrylic acid ester and acrylonitrile) without chloride, or combinations thereof. In some embodiments, the adhesive composition comprises 0.1 to 30 wt-% of at least one acrylic copolymer based on the total weight of the composition, 18 to 22 wt-% of at least one acrylic copolymer based on the total weight of the composition or 20 wt-% of at least one acrylic copolymer based on the total weight of the composition. In some embodiments, the at least one bead bond layer comprises the cured product of the adhesive composition. In some embodiments, both the at least one bead bond layer and the at least one application layer comprises the cured product of the adhesive composition. In some embodiments, the at least one bead bond layer and the at least one application layer comprise the same composition. In some embodiments, the at least one bead bond layer and the at least one application layer were applied in a single step. In some embodiments, the at least one bead bond layer and the at least one application layer were cured in a single step. In some embodiments, the application layer comprises fabric. In some embodiments, the fabric is woven or non-woven. In some embodiments, the at least one bead bond layer further comprises fillers. In some embodiments, the at least one bead bond layer further comprises modifiers. In some embodiments, the modifiers are selected from: adhesion promoters, pigments, or combinations thereof. In some embodiments, the adhesion promoters comprise one or more silane coupling agent. In some embodiments, the at least one bead bond layer does not include silane coupling agents. In some embodiments, the adhesive composition is cured using actinic energy. In some embodiments, the actinic energy comprises visible light, ultraviolet (UV) light, e-beam energy, or combinations thereof. In some embodiments, the adhesive composition is cured via a single application of energy. In some embodiments, the adhesive composition is cured via more than one application of energy.

Some illustrative embodiments include articles that comprise at least one application layer; at least one bead bond layer; a layer of optical elements that are partially embedded in the at least one bead bond layer; and at least one reflective layer that is located functionally between the layer of optical elements and the bead bond layer, wherein the at least one application layer comprises a cured product of an adhesive composition comprising: polymerized units of one or more (meth)acrylate ester monomers derived from an alcohol containing 1 to 14 carbon atoms; at least one acrylic copolymer; and at least one initiator.

In some embodiments, the at least one acrylic copolymer comprises butyl acrylate, methyl methacrylate, polyvinyl butyral, polyvinyl acetate, cellulose acetate, ACM (a copolymer of acrylic acid ester and 2-chloroethyl vinyl ether) containing chlorine, ANM (a copolymer of acrylic acid ester and acrylonitrile) without chloride, or combinations thereof.

In some embodiments, the adhesive composition comprises 0.1 to 30 wt-% of at least one acrylic copolymer based on the total weight of the composition, 18 to 22 wt-% of at least one acrylic copolymer based on the total weight of the composition or 20 wt-% of at least one acrylic copolymer based on the total weight of the composition. In some embodiments, both the at least one bead bond layer and the at least one application layer comprise the cured product of the adhesive composition. In some embodiments, the at least one bead bond layer and the at least one application layer comprise the cured product of the same composition. In some embodiments, the at least one bead bond layer and the at least one application layer were applied in a single step. In some embodiments, the adhesive composition is cured via a single application of energy. In some embodiments, the adhesive composition is cured via more than one application of energy.

ments, the at least one bead bond layer and the at least one application layer comprise the cured product of the same composition. In some embodiments, the at least one bead bond layer and the at least one application layer were applied in a single step. In some embodiments, the adhesive composition is cured via a single application of energy. In some embodiments, the adhesive composition is cured via more than one application of energy.

EXAMPLES

Objects and advantages may be further illustrated by the following examples, but the particular materials and amounts thereof recited in these examples, as well as other conditions and details, should not be construed to unduly limit this disclosure.

In compositions, amounts of all components are reported in parts by weight.

TABLE 2

Glossary of Materials

| Material | Abbreviation | Supplier |
|---|---|---|
| 2-ethylhexyl acrylate | EHA | BASF |
| iso-bornyl acrylate | IBOA | San Esters |
| Acrylic acid | AA | BASF |
| GENOMER ® 4188/EHA (80% GENOMER ® 4188 in 2-ethylhexyl acrylate) | GN4188/EHA | Rahn |
| KURARITY ™ LA 2330 - acrylic block copolymer | LA 2330 | Kuraray |
| Trimethylolpropane triacrylate | TMPTA | Allnex |
| 1% of TMPTA in EHA | TMPTA stock | |
| iso-octyl acrylate | IOA | 3M Co. |
| 2-octyl acrylate | 2OA | Prepared according to Example 1 of U.S. Pat. No. 7,385,020 |
| 18-carbon acrylate monomer: mixture of 2-hexyl-1-decyl acrylate (15-20), 2-octyl-1-decyl acrylate + 2-hexyl-1-dodecyl acrylate (46-54), 2-octyl-1-dodecyl acrylate (27-33) | C18HA | Prepared according to U.S. Pat. No. 8,137,807 monomer example GM4 |
| iso-steryl acrylate | ISTA | Kawa |
| Silane KBE-9103 Partially hydrolyzates of 3-triethoxysilyl-n-(1,3 dimethyl-butylidene) propylamine | KBE-9103 | Shin-Etsu |
| Irgacure 819 (Phosphine oxide, phenylbis(2,4,6-trimethylbenzoyl)-mixture of: 5-chloro-2-methyl-2H-isothiazol-3-one and 2-methyl-2H-isothiazol-3-one (3:1) | Irg 819 | BASF |

Some illustrative embodiments include articles that comprise at least one application layer; at least one bead bond layer; a layer of optical elements that are partially embedded in the at least one bead bond layer; and at least one reflective layer that is located functionally between the layer of optical elements and the bead bond layer, wherein the at least one bead bond layer comprises a cured product of an adhesive composition comprising: polymerized units of one or more (meth)acrylate ester monomers derived from an alcohol containing 1 to 14 carbon atoms; at least one urethane acrylate polymer; and at least one initiator.

In some embodiments, the adhesive composition comprises 0.1 to 50 wt-% of at least one urethane acrylate polymer based on the total weight of the adhesive composition, or 20 to 30 wt-% of at least one urethane acrylate polymer based on the total weight of the adhesive composition. In some embodiments, the at least one urethane acrylate polymer is a monofunctional urethane acrylate polymer. In some embodiments, both the at least one bead bond layer and the at least one application layer comprise the cured product of the adhesive composition. In some embodi- Preparation of Coating Syrup Formulations The base film formulations were prepared by the contents listed in each table in either a 1 gallon (3.79 liters) or 1 quart (0.95 liter) glass jar and mixing with a high shear electric motor (Netzsch Model 50 Dispersator) until a clear and homogenous solution was obtained.

For coating formulations with silane, the appropriate base film formulation and silane were combined in a cup using a centrifugal resin mixer (MAX 100 mixing cup and FlackTek Speedmixer DAC 150 FV; both from FlackTek Incorporated, Landrum, S.C.) and mixed at 2500 rpm for 15 seconds.

Example Articles Produced

Figure 6:
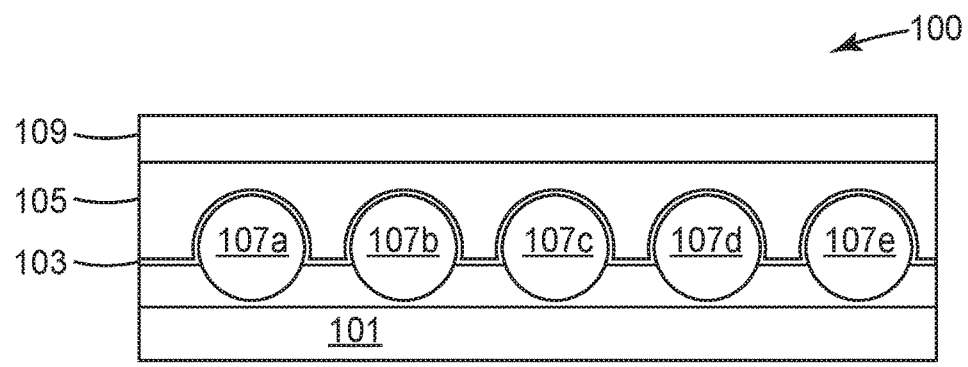
FIG. 6 is a schematic depiction of an article.

FIG. 6 shows a schematic depiction of the fabricated article used to analyze various properties of disclosed compositions. The article 100, as seen in FIG. 6 includes a liner 101, a vapor coat 103, a bead bond layer 105 with optical beads 107a-107e embedded therein, and an application layer 109. Disclosed compositions can be utilized in either the bead bond layer or the application layer.

Figure 7:
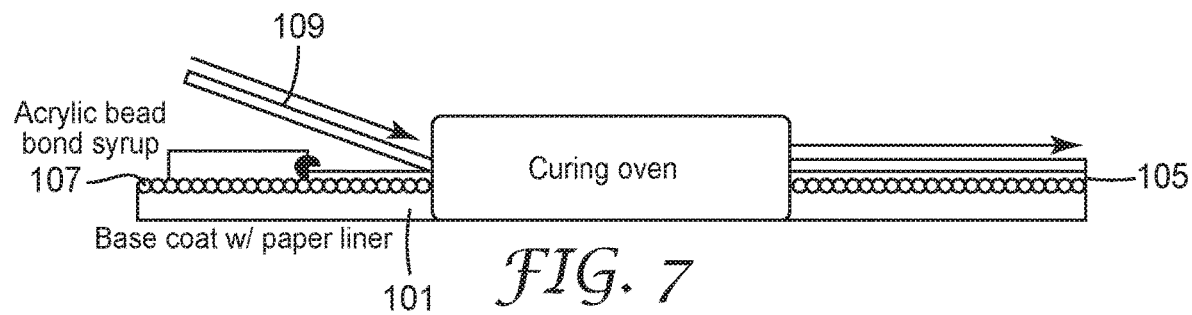
FIG. 7 shows a schematic depiction of how articles of FIG. 6 can be fabricated.

FIG. 7 shows a schematic depiction of how articles of FIG. 6 were fabricated in below examples when adhesive compositions were being evaluated as the bead bond layer and the application layer was fabric.

Figure 8:
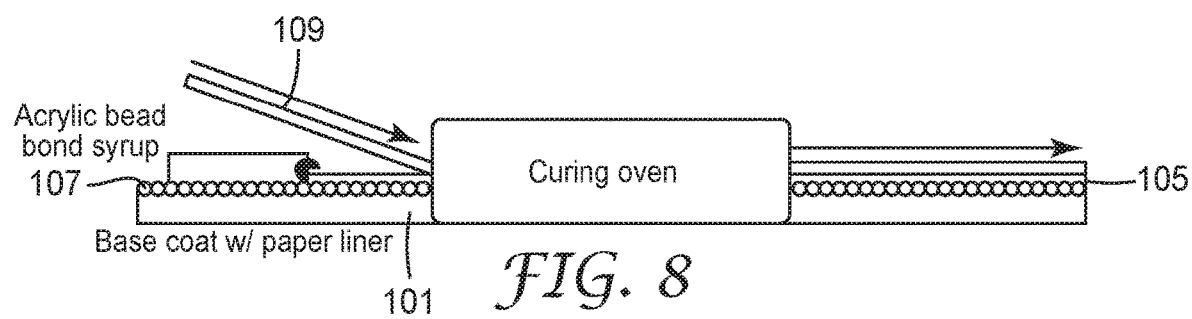
FIG. 8 shows a schematic depiction of another method of fabricating articles of FIG. 6.

FIG. 8 shows a schematic depiction of how articles of FIG. 6 were fabricated in below examples when adhesive compositions were being evaluated as the bead bond layer and the application layer was a second adhesive composition.

Figure 9A:
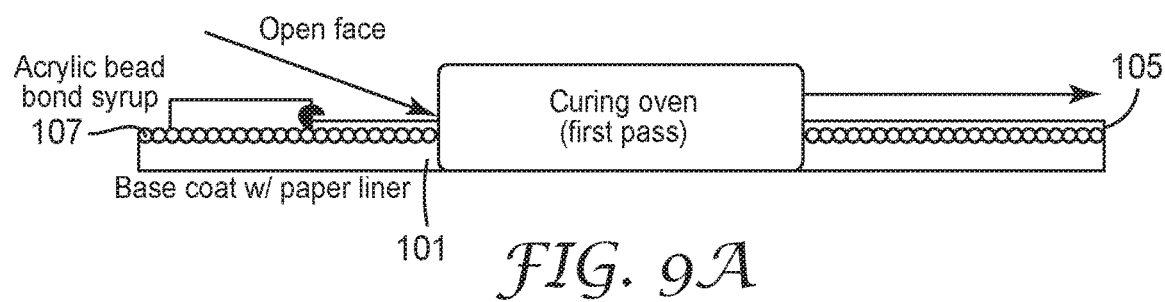
FIGS. 9*a* and 9*b* show schematic depictions of another method of fabricating articles of FIG. 6.
Figure 9B:
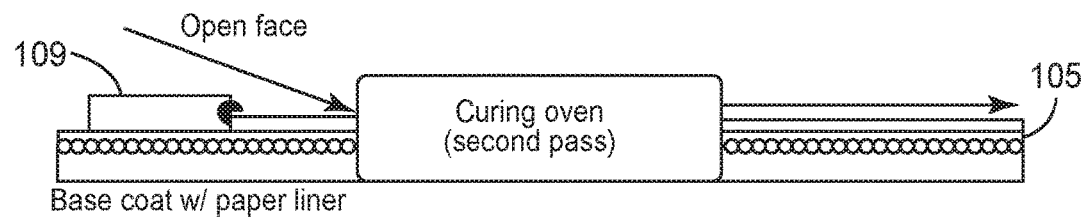

FIGS. 9a and 9b show a schematic depiction of how articles of FIG. 6 were fabricated in below examples when adhesive compositions were being evaluated both as the bead bond layer and the application layer using a two step curing process.

Figure 10:
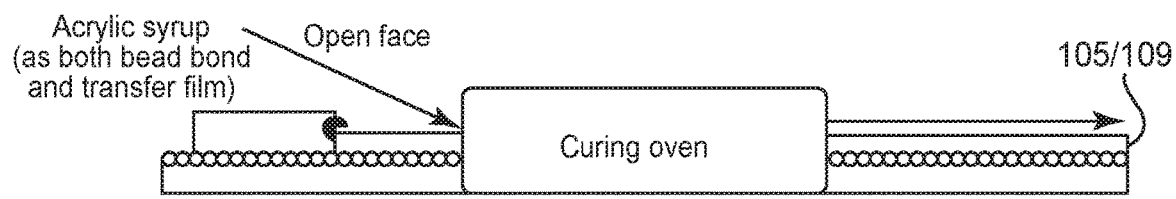
FIG. 10 shows a schematic depiction of another method of fabricating articles of FIG. 6.

FIG. 10 shows a schematic depiction of how articles of FIG. 6 were fabricated in below examples when a single adhesive composition was being evaluated both as the bead bond layer and the application layer using a single step curing process.

EXAMPLE 1

A-Film as Bead Bond with Hot Welt Adhesive as Backing

The syrups of Example 1 (Table 3) were coated with a gap setting of 0.002 inches (50 micrometers) in between a vapor coat substrate (which is a production vapor coat retroreflective material commercially available under the trade designation "Scotchlite 8710") and 3 mil polyester hot melt adhesive using a notch bar coating station. The resulting combination was exposed to a total UV-A energy of approximately 2400 milliJoules/square centimeter from the top using a plurality of fluorescent lamps having a peak emission wavelength of 365 nanometers. The total UV-A energy was determined using a POWERMAP radiometer equipped with lower power sensing head (available from EIT Incorporated, Sterling, Va.). The radiometer web speed and energy were then used to calculate the total exposure energy at the web speed used during curing of the acrylic composition

TABLE 3

Compositions of Example 1a to 1i

| Sample ID | | EHA | IBOA | AA | GN4188/EHA | TMPTA stock | 819 | Silane KBE-9103 |
|---|---|---|---|---|---|---|---|---|
| Ex. 1a | Parts | 18.75 | 8.75 | 5 | 12.5 | 5 | 0.8 | 0 |
| Ex. 1b | Parts | 18.75 | 8.75 | 5 | 12.5 | 5 | 0.8 | 2.032 |

| | | IOA | IBOA | AA | GN4188/EHA | TMPTA stock | 819 | Silane KBE-9103 |
|---|---|---|---|---|---|---|---|---|
| Ex. 1c | Parts | 18.75 | 8.75 | 5 | 12.5 | 5 | 0.8 | 2.032 |

| | | 2OA | IBOA | AA | GN4188/EHA | TMPTA stock | 819 | Silane KBE-9103 |
|---|---|---|---|---|---|---|---|---|
| Ex. 1d | Parts | 18.75 | 8.75 | 5 | 12.5 | 5 | 0.8 | 2.032 |

| | | C18HA | IBOA | AA | GN4188/EHA | TMPTA stock | 819 | Silane KBE-9103 |
|---|---|---|---|---|---|---|---|---|
| Ex. 1e | Parts | 18.75 | 8.75 | 5 | 12.5 | 5 | 0.8 | 2.032 |

| | | ISTA | IBOA | AA | GN4188/EHA | TMPTA stock | 819 | Silane KBE-9103 |
|---|---|---|---|---|---|---|---|---|
| Ex. 1f | Parts | 18.75 | 8.75 | 5 | 12.5 | 5 | 0.8 | 2.032 |

| | | EHA | IBOA | AA | GN4188/EHA | TMPTA stock | 819 | Silane KBE-9103 |
|---|---|---|---|---|---|---|---|---|
| Ex. 1g | Parts | 18 | 14.5 | 0 | 12.5 | 5 | 0.8 | 2.032 |
| Ex. 1h | Parts | 8.125 | 6.875 | 5 | 25 | 5 | 0.8 | 2.032 |

After curing, the transfer film samples were laminated to fabric at 325F, 40 psi. In Example 1g without AA in bead bond, the paper/PE liner could not be peeled after lamination and was therefore not subjected to wash tests. Table 4 shows the wash performance of the samples. The samples with EHA and monomers, and the sample with 50% GN4188/EHA showed good wash performance. Additionally, the addition of silane did not affect performance.

TABLE 4

ISO 6330 Method 6N wash performance of samples with different bead bond.

| Sample ID | Ra initial | Ra after 5 cycles | Ra after 10 cycles | Ra after 15 cycles | Ra after 20 cycles | Ra after 25 cycles |
|---|---|---|---|---|---|---|
| Ex. 1a | 475 | 466 | 452 | 427 | 422 | 397 |
| Ex. 1b | 503 | 442 | 439 | 427 | 414 | 402 |
| Ex. 1c | 496 | 452 | 441 | 425 | 411 | 393 |
| Ex. 1d | 499 | 449 | 437 | 417 | 406 | 373 |
| Ex. 1e | 475 | 451 | 413 | 382 | 359 | 317 |
| Ex. 1f | 511 | 487 | 474 | 454 | 415 | 397 |
| Ex. 1h | 459 | 475 | 464 | 447 | 388 | 324 |

EXAMPLE 2

A-Film as Bead Bond and Fabric as Backing

A vapor coat substrate ("Scotchlite 8710") was used as the bottom input liner, and the acrylic syrups (Table 5, BBA-0-EHA and HMA) were coated using a notch bar coating station with a gap setting of 0.005 inches (125 micrometers). For Examples 2b and 2d, the coated composition was exposed to a total UV-A energy of 260 milliJoules/square centimeter on the open surface of the composition in a nitrogen-inerted environment using an array of UV lamps having a peak emission wavelength of 405 nm. Following UV irradiation, the fabric (polyester/cotton) was laminated onto the top of the coated and irradiated syrup, and the resulting open face combinations were exposed to a total UV-A energy of approximately 2400 milliJoules/square centimeter from the top in a nitrogen-inerted environment using a plurality of fluorescent lamps having a peak emission wavelength of 365 nanometers. For Examples 2a and 2c, the samples were not exposed to UV irradiation prior to laminating the fabric before fluorescent lamp curing. The total UV-A energy was determined using a POWERMAP radiometer equipped with lower power sensing head (available from EIT Incorporated, Sterling, Va.). The radiometer web speed and energy were then used to calculate the total exposure energy at the web speed used during curing of the acrylic composition.

TABLE 5

Formulations as bead bond for fabric samples (with UV lamp off and on)

| Sample ID | | EHA | IBOA | AA | GN4188/ EHA | TMPTA stock | 819 | Silane KBE-9103 | LED |
|---|---|---|---|---|---|---|---|---|---|
| Ex. 2a | Parts | 18.75 | 8.75 | 5 | 12.5 | 5 | 0.8 | 2.032 | off |
| Ex. 2b | parts | 18.75 | 8.75 | 5 | 12.5 | 5 | 0.8 | 2.032 | on |

| | | EHA | IBOA | AA | LA2330 | TMPTA | 819 | Silane KBE-9103 | |
|---|---|---|---|---|---|---|---|---|---|
| Ex. 2c | Parts | 19.95 | 15 | 5 | 10 | 0.05 | 0.4 | 2.016 | off |
| Ex. 2d | Parts | 19.95 | 15 | 5 | 10 | 0.05 | 0.4 | 2.016 | on |

After curing, the paper/PE carrier on the bead side was removed, the samples without UV curing showed a dark grey appearance while the samples with UV curing showed a shining silver appearance. In all of the samples except Example 2d, the fabric separated from the cured bead bond. The samples were home washed according to ISO 6330 method 6N (dry every 5 cycles). Table 6 shows the wash performance: Example 2a shows better wash performance than Example 2c, and further UV curing (Example 2b) reduces the wash performance.

TABLE 6

ISO 6330 method 6N wash performance of samples with fabric backing.

| Sample ID | Ra initial | Ra after 5 cycles | Ra after 10 cycles | Ra after 15 cycles | Ra after 20 cycles | Ra after 25 cycles |
|---|---|---|---|---|---|---|
| Ex. 2a | 399 | 435 | 417 | 377 | 352 | 316 |
| Ex. 2c | 476 | 308 | 249 | 193 | 156 | 114 |
| Ex. 2b | 460 | 215 | 90 | 50 | | |

EXAMPLE 3

A-Film as Hot Melt Adhesive on SRM C420

The compositions of Table 6 were coated on a reflective material commercially available under the trade designation "Scotchlite C420" (with phenolic rubber bead bond) using a notch bar coating station with a gap setting of 0.003 inches (75 micrometers). The resulting open face combinations were exposed to a total UV-A energy of approximately 2400 milliJoules/square centimeter from the top in a nitrogen-inerted environment using a plurality of fluorescent lamps having a peak emission wavelength of 365 nanometers

TABLE 7

Compositions for Example 3a to 3k

| Sample ID | | EHA | IBOA | AA | LA2330 | TMPTA | 819 |
|---|---|---|---|---|---|---|---|
| Ex. 3a | Parts | 39.9 | 30 | 10 | 20 | 0.1 | 0.8 |

| | | EHA | IBOA | AA | LA2330 | TMPTA stock | 819 |
|---|---|---|---|---|---|---|---|
| Ex. 3b | Parts | 37 | 33 | 10 | 10 | 10 | 0.8 |
| Ex. 3c | Parts | 40 | 35 | 10 | 5 | 10 | 0.8 |
| Ex. 3d | Parts | 44 | 36 | 10 | 0 | 10 | 0.8 |
| Ex. 3e | Parts | 28.5 | 41.5 | 0 | 20 | 10 | 0.8 |

TABLE 7-continued

Compositions for Example 3a to 3k

| | | IOA | IBOA | AA | LA2330 | TMPTA stock | 819 |
|---|---|---|---|---|---|---|---|
| Ex. 3f | Parts | 30 | 30 | 10 | 20 | 10 | 0.8 |

| | | 2OA | IBOA | AA | LA2330 | TMPTA stock | 819 |
|---|---|---|---|---|---|---|---|
| Ex. 3g | Parts | 30 | 30 | 10 | 20 | 10 | 0.8 |

| | | EHA | IBOA | AA | LA2330 | TMPTA stock | 819 |
|---|---|---|---|---|---|---|---|
| Ex. 3h | Parts | 30 | 30 | 10 | 20 | 10 | 0.8 |
| Ex. 3i | Parts | 27.5 | 30 | 12.5 | 20 | 10 | 0.8 |
| Ex. 3j | Parts | 25 | 30 | 15 | 20 | 10 | 0.8 |

After curing, the transfer film samples were laminated to fabric at 325° F., 40 psi, 20 seconds, and then home washed using ISO 6330 method 6N (dry every 5 cycles). In Example 3e, without AA, the adhesive stuck to the paper and could not be separated; and therefore was not subjected to wash tests. Additionally, that composition caused streaks during the coating process and therefore may not be suited for all applications. Tables 8a and 8b shows wash performance, Table 8a shows no wash performance difference in samples with different LA2330 loading in the compositions, except Example 3d, without LA 2330, delaminated after 10 cycles, and samples using EHA or monomers showed similar wash performance. Table 8b shows that compositions including 15% AA resulted in delamination after 15 cycles wash and samples with 12.5% AA showed slightly lower wash performance compared to 10% AA in the compositions.

TABLE 8a

ISO 6330 method 6N wash performance of samples with different loading of LA2330 in bead bond, comparison between EHA and its replacement

| Sample ID | Ra initial | Ra after 5 cycles | Ra after 10 cycles | Ra after 15 cycles | Ra after 20 cycles | Ra after 25 cycles |
|---|---|---|---|---|---|---|
| Ex. 3a | 517 | 491 | 462 | 433 | 401 | 368 |
| Ex. 3b | 515 | 496 | 466 | 441 | 415 | 387 |
| Ex. 3c | 513 | 492 | 472 | 443 | 410 | 389 |
| Ex. 3d | 501 | 473 | 0 (delamination) | | | |
| Ex. 3f | 515 | 492 | 474 | 440 | 405 | 378 |
| Ex. 3g | 516 | 505 | 457 | 423 | 369 | 305 |

TABLE 8b

ISO 6330 method 6N wash performance of samples
with 10%, 12%, and 15% AA in compositions.

| Sample ID | Ra initial | Ra after 5 cycles | Ra after 10 cycles | Ra after 15 cycles | Ra after 20 cycles | Ra after 25 cycles |
|---|---|---|---|---|---|---|
| Ex. 3h | 505 | 493 | 467 | 447 | 403 | 361 |
| Ex. 3i | 511 | 472 | 436 | 414 | 370 | 338 |
| Ex. 3j | 512 | 479 | 387 | 0 (delamination) | | |

EXAMPLE 4

A-Film as Both Bead Bond and Adhesive in One-Layer Coating

Reflective material ("Scotchlite 8710") vapor coat was used as the bottom input liner, and the acrylic syrups (Table 9) were coated using a notch bar coating station with a gap setting of 0.005 inches (125 micrometers). The resulting open face combinations were exposed to a total UV-A energy of approximately 2400 milliJoules/square centimeter from the top in a nitrogen-inerted environment using a plurality of fluorescent lamps having a peak emission wavelength of 365 nanometers.

TABLE 9

Formulations as both bead bond and adhesive through one-layer coating

| Sample ID | | EHA | IBOA | AA | GN4188/ EHA | TMPTA stock | 819 | Silane KBE-9103 |
|---|---|---|---|---|---|---|---|---|
| Ex. 4a | Parts | 18.75 | 8.75 | 5 | 12.5 | 5 | 0.8 | 2.032 |
| | | EHA | IBOA | AA | LA2330 | TMPTA | 819 | Silane KBE-9103 |
| Ex. 4b | Parts | 19.95 | 15 | 5 | 10 | 0.05 | 0.4 | 2.016 |

After curing, the paper/PE bead carrier was removed, and mechanical properties (tensile strength and elongation at break) was measured using an Instron machine (1 inch strip, 12 inches/min pull speed). The results are seen in Table 10.

TABLE 10

Tensile properties of free films

| Sample | Bottom liner | Layer 1: Syrup coated | Tensile strength/ Kgf/in | Elongation at break |
|---|---|---|---|---|
| Ex. 4a | 8710 vapor coat | BBA-0_EHA (25% GN) + silane | 0.47 | 352% |
| Ex. 4b | 8710 vapor coat | HMA (20% LA2330) + silane | 0.86 | 326% |

The transfer film samples were laminated to fabric at 325° F., 40 psi, 20 seconds, and then home washed using ISO 6330 method 6N (dry every 5 cycles). Table 11 shows wash performance, Example 4a delaminated after washing, since the formulation with GN4188/EHA needs a higher temperature to laminate to fabric, and Example 4b showed good wash performance.

TABLE 11

ISO 6330 method 6N wash performance of sample with
one layer coating as both bead bond and adhesive

| Sample | Ra initial | Ra after 5 cycles | Ra after 10 cycles | Ra after 15 cycles | Ra after 20 cycles | Ra after 25 cycles |
|---|---|---|---|---|---|---|
| Ex. 4b | 476 | 423 | 316 | 221 | 160 | 122 |

EXAMPLE 5

Use the Same A-Film as Adhesive, but a Variety of A-Film Based Bead Bonds

All samples used the formulations as application layer (Table 12a), but different formulations as bead bond (Table 12b, 12c).

TABLE 12a

A-Film hot melt adhesive formulation.

| | EHA | IBOA | AA | LA2330 | TMPTA | 819 |
|---|---|---|---|---|---|---|
| Parts | 19.95 | 15 | 5 | 10 | 0.05 | 0.4 |

TABLE 12b

Formulations as bead bond.

| Sample ID | | EHA | IBOA | AA | GN4188/ EHA | TMPTA stock | 819 | Silane KBE-9103 |
|---|---|---|---|---|---|---|---|---|
| Ex. 5a | Parts | 18.75 | 8.75 | 5 | 12.5 | 5 | 0.8 | 0 |
| Ex. 5b | Parts | 18.75 | 8.75 | 5 | 12.5 | 5 | 0.8 | 2.032 |
| | | IOA | IBOA | AA | GN4188/ EHA | TMPTA stock | 819 | Silane KBE-9103 |
| Ex. 5c | Parts | 18.75 | 8.75 | 5 | 12.5 | 5 | 0.8 | 2.032 |
| | | 2OA | IBOA | AA | GN4188/ EHA | TMPTA stock | 819 | Silane KBE-9103 |
| Ex. 5d | Parts | 18.75 | 8.75 | 5 | 12.5 | 5 | 0.8 | 2.032 |
| | | C18HA | IBOA | AA | GN4188/ EHA | TMPTA stock | 819 | Silane KBE-9103 |
| Ex. 5e | Parts | 18.75 | 8.75 | 5 | 12.5 | 5 | 0.8 | 2.032 |
| | | ISTA | IBOA | AA | GN4188/ EHA | TMPTA stock | 819 | Silane KBE-9103 |
| Ex. 5f | Parts | 18.75 | 8.75 | 5 | 12.5 | 5 | 0.8 | 2.032 |
| | | EHA | IBOA | AA | GN4188/ EHA | TMPTA stock | 819 | Silane KBE-9103 |
| Ex. 5g | Parts | 18 | 14.5 | 0 | 12.5 | 5 | 0.8 | 2.032 |

TABLE 12c

A-Film formulations as bead bond.

| Sample ID | | EHA | IBOA | AA | GN4188/ EHA | LA2330 | TMPTA stock | 819 | Silane KBE-9103 |
|---|---|---|---|---|---|---|---|---|---|
| Ex. 5i | parts | 150 | 70 | 40 | 100 | | 40 | 3.2 | 16.12 |
| Ex. 5j | parts | 47.5 | 17.5 | 10 | 15 | | 10 | 0.8 | 4.032 |
| Ex. 5k | parts | 52.5 | 17.5 | 10 | 10 | | 10 | 0.8 | 4.032 |
| Ex. 5l | parts | 14 | 6 | 4 | 10 | 2 | 4 | 0.32 | 4.032 |
| Ex. 5m | parts | 12 | 6 | 4 | 10 | 4 | 4 | 0.32 | 4.032 |
| Ex. 5n | parts | 8 | 6 | 4 | 18 | | 4 | 0.32 | 1.613 |
| Ex. 5o | parts | 8 | 8 | 2 | 18 | | 4 | 0.32 | 1.613 |
| Ex. 5p | parts | 15 | 7 | 4 | 10 | | 4 | 0.32 | 1.613 |
| Ex. 5q | parts | 15 | 9 | 2 | 10 | | 4 | 0.32 | 1.613 |

Samples were prepared in two passes. In the first pass, the "Scotchlite 8710" vapor coat was used as the bottom input liner, and the bead bond syrup (Table 12b and 12c) was coated over the vapor coat using a notch bar coating station with a gap setting of 0.002 inches (51 micrometers). The resulting open face combinations were exposed to a total UV-A energy of approximately 2400 milliJoules/square centimeter from the top in a nitrogen-inerted environment using a plurality of fluorescent lamps having a peak emission wavelength of 365 nanometers. Then, in the second pass, the cured combination from the first pass (vapor coat +bead bond) was used as the input liner, and the transfer film syrup (Table 12a) was coated over the bead coat using a notch bar coating station with a gap setting of 0.003 inches (75 micrometers). The resulting open face combinations were exposed to a total UV-A energy of approximately 2400 milliJoules/square centimeter from the top in a nitrogen-inerted environment using an plurality of fluorescent lamps having a peak emission wavelength of 365 nanometers.

After curing, the paper/PE bead carrier was removed, and mechanical properties (tensile strength and elongation at break) was measured using Instron (1 inch strip, 12 inches/ min pull speed) (Table 13). Most samples show decent elongation at break of values>400%.

TABLE 13

Tensile properties of the samples.

| Sample | Tensile Strength/ Kgf/in | Elongation at break/ % |
|---|---|---|
| Ex. 5a | 2.1 | 457 |
| Ex. 5b | 2.4 | 569 |
| Ex. 5c | 2.4 | 519 |
| Ex. 5d | 1.3 | 309 |
| Ex. 5e | 1.7 | 521 |
| Ex. 5f | 1.8 | 397 |
| Ex. 5g | 1.1 | 430 |
| Ex. 5h | 1.4 | 295 |
| Ex. 5i | 2.0 | 474 |
| Ex. 5j | 1.5 | 369 |
| Ex. 5k | 1.9 | 580 |
| Ex. 5l | 2.1 | 531 |
| Ex. 5m | 2.3 | 613 |
| Ex. 5n | 3.1 | 479 |
| Ex. 5o | 2.5 | 478 |
| Ex. 5p | 2.9 | 474 |
| Ex. 5q | 2.3 | 437 |

The transfer film samples were laminated to fabric at 325° F., 40 psi, 20 seconds, and then home washed using ISO 6330 method 6N (dry every 5 cycles). For sample Ex. 5g without AA, the paper/PE liner could not be peeled after lamination. Tables 14a, 14b and 14c show wash performance. Table 14a shows that samples with EHA and its replacement monomers have similar wash performance, except Example 5f (ISTA), which showed slightly better wash performance, and the sample with higher GN4188/EHA (50%) also show good wash performance. Additionally, having silane in the formulation only had a slight improvement in the wash performance, and is therefore optional. Table 14b shows reducing GN4188/EHA amount from 25% to 15% to 10% decreases wash performance, and adding acrylic block copolymer commercially available under the trade designation "KURARITY" on top of GN4188/EHA reduces wash performance as well. Table 14c shows using 25% or 45% GN4188/EHA, 5% or 10% AA in bead bond does not affect wash.

TABLE 14a

ISO 6330 Method 6N wash performance of samples with different bead bond - EHA and its replacement monomers, and higher loading (50%) of GN4188/EHA.

| Sample | Ra initial | Ra after 5 cycles | Ra after 10 cycles | Ra after 15 cycles | Ra after 20 cycles | Ra after 25 cycles |
|---|---|---|---|---|---|---|
| Ex. 5a | 506 | 424 | 352 | 275 | 190 | 114 |
| Ex. 5b | 506 | 431 | 372 | 306 | 245 | 178 |
| Ex. 5c | 500 | 423 | 357 | 290 | 229 | 179 |
| Ex. 5d | 504 | 426 | 362 | 310 | 240 | 182 |
| Ex. 5e | 502 | 404 | 322 | 279 | 244 | 225 |
| Ex. 5f | 507 | 450 | 416 | 398 | 343 | 347 |
| Ex. 5h | 501 | 448 | 401 | 358 | 302 | 276 |

TABLE 14b

ISO 6330 method 6N wash performance of samples with different bead bond formulations

| Sample | Ra initial | Ra after 5 cycles | Ra after 10 cycles | Ra after 15 cycles | Ra after 20 cycles | Ra after 25 cycles |
|---|---|---|---|---|---|---|
| Ex. 5i | 510 | 459 | 386 | 311 | 250 | 211 |
| Ex. 5j | 507 | 424 | 296 | 219 | 163 | 128 |
| Ex. 5k | 510 | 416 | 295 | 223 | 172 | 134 |
| Ex. 5l | 514 | 444 | 313 | 234 | 165 | 121 |
| Ex. 5m | 510 | 369 | 175 | 103 | 67 | 46 |

TABLE 14c

ISO 6330 method 6N wash Performance of samples with different bead bond formulations

| Sample | Ra initial | Ra after 5 cycles | Ra after 10 cycles | Ra after 15 cycles | Ra after 20 cycles | Ra after 25 cycles |
|---|---|---|---|---|---|---|
| Ex. 5n | 501 | 443 | 383 | 305 | 276 | 190 |
| Ex. 5o | 521 | 449 | 392 | 347 | 313 | 222 |
| Ex. 5p | 512 | 465 | 388 | 349 | 334 | 266 |
| Ex. 5q | 515 | 459 | 382 | 330 | 306 | 262 |

EXAMPLE 6

Same Composition for Bead Bond, but a Variety of Compositions for Application Layer All samples used the same bead bond formulation (Table 15), but different formulations as the application layer (Table 16).

TABLE 15

A-Film bead bond formulation

| | EHA | IBOA | AA | GN4188/ EHA | TMPTA stock | 819 | Silane KBE-9103 |
|---|---|---|---|---|---|---|---|
| Parts | 18.75 | 8.75 | 5 | 12.5 | 5 | 0.8 | 2.032 |

TABLE 16

Compositions for Application Layer

| Sample ID | | EHA | IBOA | AA | LA2330 | TMPTA | 819 |
|---|---|---|---|---|---|---|---|
| Ex. 6a | parts | 39.9 | 30 | 10 | 20 | 0.1 | 0.8 |

| | | EHA | IBOA | AA | LA2330 | TMPTA stock | 819 |
|---|---|---|---|---|---|---|---|
| Ex. 6b | parts | 37 | 33 | 10 | 10 | 10 | 0.8 |
| Ex. 6c | parts | 40 | 35 | 10 | 5 | 10 | 0.8 |
| Ex. 6d | parts | 44 | 36 | 10 | 0 | 10 | 0.8 |

| | | IOA | IBOA | AA | LA2330 | TMPTA stock | 819 |
|---|---|---|---|---|---|---|---|
| Ex. 6e | parts | 30 | 30 | 10 | 20 | 10 | 0.8 |

| | EHA | IBOA | AA | LA2330 | TMPTA | 819 |
|---|---|---|---|---|---|---|
| Ex. 6f parts | 39.9 | 30 | 10 | 20 | 0.1 | 0.8 |

| | | EHA | IBOA | AA | GN4188/ EHA | LA2330 | TMPTA stock | 819 |
|---|---|---|---|---|---|---|---|---|
| Ex. 6g | parts | 25 | 30 | 10 | 5 | 20 | 10 | 0.8 |
| Ex. 6h | parts | 20 | 30 | 10 | 10 | 20 | 10 | 0.8 |
| Ex. 6i | parts | 23 | 27 | 10 | | 30 | 10 | 0.8 |

Samples were prepared in two passes. In the first pass, the reflective material (Scotchlite 8710) vapor coat was used as the bottom input liner, and the bead bond syrup (Table 15) was coated over the bead coat using a notch bar coating station with a gap setting of 0.002 inches (51 micrometers). The resulting open face combinations were exposed to a total UV-A energy of approximately 2400 milliJoules/square centimeter from the top in a nitrogen-inerted environment using a plurality of fluorescent lamps having a peak emission wavelength of 365 nanometers. Then, in the second pass, the cured combination from the first pass (vapor coat+A-film bead bond) was used as the input liner, and the transfer film syrup (Table 16) was coated over the bead coat using a notch bar coating station with a gap setting of 0.003 inches (75 micrometers). The resulting open face combinations were exposed to a total UV-A energy of approximately 2400 milliJoules/square centimeter from the top in a nitrogen-inerted environment using a plurality of fluorescent lamps having a peak emission wavelength of 365 nanometers.

After curing, the paper/PE bead carrier was removed, and mechanical properties (tensile strength and elongation at break) was measured using Instron (1 inch strip, 12 inches/min pull speed) (Table 17). Most samples show decent elongation at break of values>400%.

TABLE 17

Tensile properties of the samples

| Sample | Tensile Strength/ Kgf/in | Elongation at break/ % |
|---|---|---|
| Ex. 6a | 2.3 | 555 |
| Ex. 6b | 2 | 605 |
| Ex. 6c | 2.7 | 620 |
| Ex. 6d | 1.4 | 673 |
| Ex. 6e | 2.2 | 371 |
| Ex. 6f | 2 | 474 |

TABLE 17-continued

Tensile properties of the samples

| Sample | Tensile Strength/ Kgf/in | Elongation at break/ % |
|---|---|---|
| Ex. 6g | 2.1 | 516 |
| Ex. 6h | 2.1 | 263 |
| Ex. 6i | 2.5 | 522 |

The transfer film samples were laminated to fabric at 325° F., 40 psi, 20 seconds, and then home washed using ISO 6330 method 6N (dry every 5 cycles). Tables 18a and 18b show wash performance. Table 18a shows wash performance of samples with different formulations—different loading of LA2330 in adhesive, and replacement of EHA with IOA. Samples show good wash performance, except Example 6d (no LA2330), delaminated after 15 cycles. Table 18b shows 20% or 30% LA2330, and extra 5% or 10% GN4188/EHA urethane oligomers in adhesive does not affect wash, except Example 6h (with extra 10% GN4188/EHA) delaminates during wash, indicating higher lamination temperature needed.

TABLE 18a

ISO 6330 method 6N wash performance of samples with different adhesive formulations - different LA2330 loading, and EHA replacement - IOA

| Sample | Ra initial | Ra after 5 cycles | Ra after 10 cycles | Ra after 15 cycles | Ra after 20 cycles | Ra after 25 cycles |
|---|---|---|---|---|---|---|
| Ex. 6a | 508 | 431 | 414 | 307 | 268 | 247 |
| Ex. 6b | 501 | 446 | 397 | 327 | 269 | 241 |
| Ex. 6c | 503 | 431 | 388 | 282 | 213 | 196 |
| Ex. 6d | 501 | 397 | 349 | 0 (delamination) | | |
| Ex. 6e | 508 | 434 | 411 | 335 | 289 | 257 |

TABLE 18b

ISO 6330 method 6N wash performance of samples with different adhesive formulations.

| Sample | Ra initial | Ra after 5 cycles | Ra after 10 cycles | Ra after 15 cycles | Ra after 20 cycles | Ra after 25 cycles |
|---|---|---|---|---|---|---|
| Ex. 6f | 510 | 459 | 386 | 311 | 250 | 211 |
| Ex. 6g | 515 | 446 | 375 | 288 | 241 | 210 |
| Ex. 6h | 518 | 413 | 382 | 299 | 0 (delamination) | |
| Ex. 6i | 516 | 452 | 380 | 292 | 237 | 204 |

EXAMPLE 7

Comparison of Different Molecular Weights of Block Copolymers Molecular and Relative % of Each Block Poly(methyl methacrylate)-Poly(n-butyl acrylate)-Poly(methyl methacrylate) triblock copolymers (PMMA-PnBA-PMMA) were purchased from Kuraray under the trade designation "KURARITY. Varying grades with different molecular weight and % PMMA content are available. LA2140, LA2250, and LA4285 have lower molecular weight than LA2330 (all available under the trade designation "KURARITY") with varying contents of PMMA, while LA2330 has higher molecular weight. (more detail can be found regarding the molecular weights and other characteristics at: http://www.elastomer.kuraray.com/fileadmin/user_upload/ELASTOMERE/DOWNLOADS/product_brochures/KURARITY.pdf).

Samples were prepared in two passes. In the first pass, the reflective material (Scotchlite 8710) vapor coat was used as the bottom input liner, and the bead bond syrup (Table 19) was coated over the vapor coat using a notch bar coating station with a gap setting of 0.002 inches (51 micrometers). The resulting open face combinations were exposed to a total UV-A energy of approximately 2400 milliJoules/square centimeter from the top in a nitrogen-inerted environment using a plurality of fluorescent lamps having a peak emission wavelength of 365 nanometers. Then, in the second pass, the cured combination from the first pass (vapor coat+A-film bead bond) was used as the input liner, and the transfer film syrup (Table 20) was coated over the bead coat using a notch bar coating station with a gap setting of 0.003 inches (75 micrometers). The resulting open face combinations were exposed to a total UV-A energy of approximately 2400 milliJoules/square centimeter from the top in a nitrogen-inerted environment using an plurality of fluorescent lamps having a peak emission wavelength of 365 nanometers.

TABLE 19

Bead bond formulations with different block copolymers.

| | EHA | IBOA | AA | LA2140 | TMPTA | 819 |
|---|---|---|---|---|---|---|
| Ex. 7a | 39.90% | 30.00% | 10.00% | 20.00% | 0.10% | 0.80% |
| | 39.9 | 30 | 10 | 20 | 0.1 | 0.8 |

| | EHA | IBOA | AA | LA2330 | TMPTA | 819 |
|---|---|---|---|---|---|---|
| Ex. 7b | 39.90% | 30.00% | 10.00% | 20.00% | 0.10% | 0.80% |
| | 39.9 | 30 | 10 | 20 | 0.1 | 0.8 |

| | EHA | IBOA | AA | LA2250 | TMPTA | 819 |
|---|---|---|---|---|---|---|
| Ex. 7c | 49.90% | 20.00% | 10.00% | 20.00% | 0.10% | 0.80% |
| | 49.9 | 20 | 10 | 20 | 0.1 | 0.8 |

| | EHA | IBOA | AA | LA4825 | TMPTA | 819 |
|---|---|---|---|---|---|---|
| Ex. 7d | 71.90% | 0.00% | 10.00% | 18.00% | 0.10% | 0.80% |
| | 71.9 | 0 | 10 | 18 | 0.1 | 0.8 |

TABLE 20

Adhesive formulation

| EHA | IBOA | AA | TMPTA | 819 | Mowital B30HH | Total |
|---|---|---|---|---|---|---|
| 78.00% | 0.00% | 10.00% | 0.10% | 0.80% | 12.00% | 100.90% |
| 1560 | 0 | 200 | 2 | 16 | 240 | 2018 |

After curing, the paper/PE bead carrier was removed, and mechanical properties (tensile strength and elongation at break) was measured using Instron (1 inch strip, 12 inches/min pull speed) (Table 7). Most samples show decent elongation at break of values>400%.

The transfer film samples were laminated to fabric at 325° F., 40 psi, 20 seconds, and then home washed using ISO 6330 method 6N (dry every 5 cycles). The samples with different block copolymers show good wash performance (Table 21).

TABLE 21

Tensile properties of samples with different copolymers

| Sample | Tensile Strength/ Kgf/in | Elongation |
|---|---|---|
| Ex. 7a | 0.86 | 366% |
| Ex. 7b | 1.25 | 460% |
| Ex. 7c | 1.25 | 406% |
| Ex. 7d | 1.39 | 486% |

TABLE 22

ISO 6330 method 6N wash of samples with different copolymer in bead bond

| Sample | Ra initial | Ra after 5 cycles | Ra after 10 cycles | Ra after 15 cycles | Ra after 20 cycles | Ra after 25 cycles |
|---|---|---|---|---|---|---|
| Ex. 7a | 515 | 485 | 433 | 421 | 377 | 331 |
| Ex. 7b | 514 | 479 | 442 | 430 | 373 | 336 |

TABLE 22-continued

ISO 6330 method 6N wash of samples with different copolymer in bead bond

| Sample | Ra initial | Ra after 5 cycles | Ra after 10 cycles | Ra after 15 cycles | Ra after 20 cycles | Ra after 25 cycles |
|---|---|---|---|---|---|---|
| Ex. 7c | 515 | 482 | 448 | 430 | 370 | 325 |
| Ex. 7d | 515 | 473 | 442 | 385 | 284 | 232 |

EXAMPLE 8

Different Amounts of Polar Monomer

Bead bond formulations with acrylic acid loading from 1 to 5% (Table 23) syrup was coated with a gap setting of 0.002 inches (50 micrometers) in between a vapor coat substrate (Reflective Material "Scotchlite 8710" production vapor coat) and 3 mil polyester hot melt adhesive using a notch bar coating station. The resulting combination was exposed to a total UV-A energy of approximately 2400 milliJoules/square centimeter from the top using a plurality of fluorescent lamps having a peak emission wavelength of 365 nanometers. The total UV-A energy was determined using a POWERMAP radiometer equipped with lower power sensing head (available from EIT Incorporated, Sterling, Va.). The radiometer web speed and energy were then used to calculate the total exposure energy at the web speed used during curing of the acrylic composition.

TABLE 23

Compositions with different acrylic acid loading.

| | EHA | IBOA | AA | GN4188/ EHA | TMPTA stock | 819 | Total |
|---|---|---|---|---|---|---|---|
| Ex. 8a | 36.00% | 28.00% | 1.00% | 25.00% | 10.00% | 0.80% | 100.80% |
| | 18 | 14 | 0.5 | 12.5 | 5 | 0.8 | 50.8 |
| Ex. 8b | 36.00% | 27.00% | 2.00% | 25.00% | 10.00% | 0.80% | 100.80% |
| | 18 | 13.5 | 1 | 12.5 | 5 | 0.8 | 50.8 |
| Ex. 8c | 36.50% | 25.50% | 3.00% | 25.00% | 10.00% | 0.80% | 100.80% |
| | 18.25 | 12.75 | 1.5 | 12.5 | 5 | 0.8 | 50.8 |
| Ex. 8d | 36.50% | 24.50% | 4.00% | 25.00% | 10.00% | 0.80% | 100.80% |
| | 18.25 | 12.25 | 2 | 12.5 | 5 | 0.8 | 50.8 |

After curing, the transfer film samples were laminated to fabric at 162.8° C. (325° F.), 275.8 kilopascals (40 psi), 20 seconds. Table 24 below show retroreflectivity of the samples. Paper/PE carrier of sample with 1% AA is hard to strip after lamination.

TABLE 24

Ra of samples with different AA loading.

| Sample | Ra |
|---|---|
| Ex. 8a | 443 |
| Ex. 8b | 458 |
| Ex. 8c | 469 |
| Ex. 8d | 479 |

EXAMPLE 9

No Polymer Add of Any Type in Bead Bond

Bead bond formulations with and without polymer added (Table 25) were coated with a gap setting of 0.002 inches (50 micrometers) in between a vapor coat substrate (reflective material "Scotchlite 8710" production vapor coat) and 3 mil polyester hot melt adhesive using a notch bar coating station. The resulting combination was exposed to a total UV-A energy of approximately 2400 milliJoules/square centimeter from the top using a plurality of fluorescent lamps having a peak emission wavelength of 365 nanometers. The total UV-A energy was determined using a POWERMAP radiometer equipped with lower power sensing head (available from EIT Incorporated, Sterling, Va.). The radiometer web speed and energy were then used to calculate the total exposure energy at the web speed used during curing of the acrylic composition.

TABLE 25

Bead bond formulation with and without polymer added

|  | EHA | IBOA | AA | GN4188/ EHA | TMPTA stock | 819 | Total |
|---|---|---|---|---|---|---|---|
| Ex. 9a | 57.50% | 17.50% | 10.00% | 5.00% | 10.00% | 0.80% | 100.80% |
|  | 28.75 | 8.75 | 5 | 2.5 | 5 | 0.8 | 50.8 |
| Comparative 9 | 62.50% | 17.50% | 10.00% | 0.00% | 10.00% | 0.80% | 100.80% |
|  | 31.25 | 8.75 | 5 | 0 | 5 | 0.8 | 50.8 |

After curing, the transfer film samples were laminated to fabric at 162.8° C. (325° F.), 275.8 kilopascals (40 psi), 20 seconds. Table 26 below shows retroreflectivity of the samples. As can be seen in Table 26, the addition of the urethane acrylate polymer does not substantially change the retroreflectivity of the sample

TABLE 26

Ra of samples with and without polymer added to bead bond

| Sample | Ra |
|---|---|
| Ex. 9 | 507 |
| Comparative 9 | 499 |

EXAMPLE 10

Random Copolymer

Random acrylate copolymers were synthesized as follows.

In an amber glass jar, 25 g methyl methacrylate (Aldrich, Milwaukee, Wis.), 75 g n-butyl acrylate (Aldrich), 100 g ethyl acetate (EM Sciences, Tarrytown, N.J.), and 0.4 g Vazo 52 (Wako, Richmond, Va.) were added and mixed to combine. Nitrogen was bubbled through the solution for 15 minutes and the jar was capped using PTFE thread tape and labelled Copoly 1. The jar was agitated gently in a 60° C. water bath for 16 hours. The resulting polymer was precipitated in methanol (EM Sciences, Tarrytown, N.J.) and dried at 45° C.

In an amber glass jar, 25g methyl methacrylate (Aldrich, Milwaukee, Wis.), 75g n-butyl acrylate (Aldrich), 100 g ethyl acetate (EM Sciences, Tarrytown, N.J.), 0.4 g Vazo 52 (Wako, Richmond, Va.), and 0.1 g isooctyl thioglycolate (Imperial Chemical Industries, London, UK) were added and mixed to combine. Nitrogen was bubbled through the solution for 15 minutes and the jar was capped using PTFE thread tape and labelled Copoly 2. The jar was agitated gently in a 60° C. water bath for 16 hours. The resulting polymer was precipitated in methanol (EM Sciences, Tarrytown, N.J.) and dried at 45° C.

Samples were prepared in two passes. In the first pass, the reflective material (Scotchlite 8710) vapor coat was used as the bottom input liner, and the bead bond syrup (Table 27) was coated over the vapor coat using a notch bar coating station with a gap setting of 0.002 inches (51 micrometers). The resulting open face combinations were exposed to a total UV-A energy of approximately 2400 milliJoules/square centimeter from the top in a nitrogen-inerted environment using a plurality of fluorescent lamps having a peak emission wavelength of 365 nanometers. Then, in the second pass, the cured combination from the first pass (vapor coat+A-film bead bond) was used as the input liner, and the hot melt adhesive made from random copolymers syrup (Table 28) was coated over the bead coat using a notch bar coating station with a gap setting of 0.003 inches (75 micrometers). The resulting open face combinations were exposed to a total UV-A energy of approximately 2400 milliJoules/square centimeter from the top in a nitrogen-inerted environment using a plurality of fluorescent lamps having a peak emission wavelength of 365 nanometers.

TABLE 27

Bead bond formulation

| EHA | IBOA | AA | GN4188/ EHA | TMPTA stock | 819 | Total |
|---|---|---|---|---|---|---|
| 37.50% | 17.50% | 10.00% | 25.00% | 10.00% | 0.80% | 100.80% |
| 7.5 | 3.5 | 2 | 5 | 2 | 0.16 | 20.16 |

TABLE 28

Adhesive formulations with random copolymers

|  | EHA | IBOA | AA | CoPoly1 | TMPTA stock | 819 | Total |
|---|---|---|---|---|---|---|---|
| Ex. 10a | 30.00% | 30.00% | 10.00% | 20.00% | 10.00% | 0.80% | 100.80% |
|  | 30 | 30 | 10 | 20 | 10 | 0.8 | 100.8 |

|  | EHA | IBOA | AA | CoPoly2 | TMPTA stock | 819 | Total |
|---|---|---|---|---|---|---|---|
| Ex. 10b | 30.00% | 30.00% | 10.00% | 20.00% | 10.00% | 0.80% | 100.80% |
|  | 30 | 30 | 10 | 20 | 10 | 0.8 | 100.8 |

After curing, the transfer film samples were laminated to fabric at 162.8° C. (325° F.), 275.8 kilopascals (40 psi), 20 seconds. Table 29 below shows the retroreflectivity of the samples.

TABLE 29

Ra of samples with and without polymer added to bead bond

| Sample | Ra |
|---|---|
| Ex. 10a | 504 |
| Ex. 10b | 499 |

Thus, embodiments of adhesive compositions including at least one of urethane acrylate polymer or acrylate copolymers are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

The invention claimed is:

1. An article comprising:
   at least one application layer;
   at least one bead bond layer;
   a layer of optical elements that are partially embedded in the at least one bead bond layer; and
   at least one reflective layer that is located functionally between the layer of optical elements and the bead bond layer,
   wherein the at least one bead bond layer, the at least one application layer, or both comprise a cured product of an adhesive composition comprising:
      polymerized units of one or more (meth)acrylate ester monomers derived from an alcohol containing 1 to 14 carbon atoms;
      at least one of urethane acrylate polymer or at least one acrylic copolymer; and
      at least one initiator.

2. The article according to claim 1, wherein the alcohol containing 1 to 14 carbon atoms is selected from: esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol; 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, or combinations thereof.

3. The article according to claim 1, wherein the polymerized units of one or more (meth) acrylate ester monomers are selected from: ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, dodecyl acrylate, and combinations thereof.

4. The article according to claim 1, wherein the polymerized units of one or more (meth) acrylate ester monomers are selected from: 2-ethylhexyl (meth)acrylate, isooctyl (meth)acrylate, n-octyl (meth)acrylate, 2-octyl (meth)acrylate, isodecyl (meth)acrylate, and lauryl (meth)acrylate and combinations thereof.

5. The article according to claim 1, wherein at least some of the polymerized units of one or more (meth)acrylate ester monomers derived from an alcohol containing 1 to 14 carbon atoms comprise monomers when reacted to form a homopolymer has a Tg greater than 10° C.

6. The article according to claim 1 wherein the monomers are selected from: t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, norbornyl (meth)acrylate, benzyl methacrylate, 3,3,5 trimethylcyclohexyl acrylate, cyclohexyl acrylate, N-octyl acrylamide, and propyl methacrylate and combinations thereof.

7. The article according to claim 1, wherein the composition comprises at least one urethane acrylate polymer.

8. The article according to claim 1, wherein the composition comprises 0.1 to 50 wt-% of at least one urethane acrylate polymer based on the total weight of the composition, or 20 to 30 wt-% of at least one urethane acrylate polymer based on the total weight of the composition.

9. The article according to claim 1, wherein the at least one urethane acrylate polymer is a monofunctional urethane acrylate polymer.

10. The article according to claim 1, wherein the bead bond layer comprises the cured product of the adhesive composition.

11. The article according to claim 10, wherein the adhesive composition comprises urethane acrylate polymer.

12. The article according to claim 1, wherein the initiator is a photoinitiator.

13. The article according to claim 1, wherein the initiator is a thermal initiator.

14. The article according to claim 1 further comprising a polar functional monomer.

15. The article according to claim 14, wherein the polar functional monomer comprises acrylic acid.

16. The article according to claim 14, wherein the adhesive composition comprises 1 to 15 wt-% polar functional monomer, 1.5 to 12 wt-% polar functional monomer, or 2 to 10 wt-% polar functional monomer based on the total weight of the adhesive composition.

17. The article according to claim 1 further comprising one or more silane coupling agents.

18. An article comprising:
   at least one application layer;
   at least one bead bond layer;
   a layer of optical elements that are partially embedded in the at least one bead bond layer; and
   at least one reflective layer that is located functionally between the layer of optical elements and the bead bond layer,
   wherein the at least one application layer comprises a cured product of an adhesive composition comprising:
      polymerized units of one or more (meth)acrylate ester monomers derived from an alcohol containing 1 to 14 carbon atoms;
      at least one acrylic copolymer; and
      at least one initiator.

19. An article comprising:
   at least one application layer;
   at least one bead bond layer;
   a layer of optical elements that are partially embedded in the at least one bead bond layer; and at least one reflective layer that is located functionally between the layer of optical elements and the bead bond layer,
wherein the at least one bead bond layer comprises a cured product of an adhesive composition comprising:
polymerized units of one or more (meth)acrylate ester monomers derived from an alcohol containing 1 to 14 carbon atoms;
at least one urethane acrylate polymer; and
at least one initiator.

* * * * *